(12) United States Patent
Takahashi et al.

(10) Patent No.: US 6,426,974 B2
(45) Date of Patent: *Jul. 30, 2002

(54) IMAGE CONVERSION APPARATUS FOR TRANSFORMING COMPRESSED IMAGE DATA OF DIFFERENT RESOLUTIONS WHEREIN SIDE INFORMATION IS SCALED

(75) Inventors: Toshiya Takahashi, Takatsuki; Choong Seng Boon, Moriguchi, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,244

(22) Filed: Aug. 9, 1999

Related U.S. Application Data

(62) Division of application No. 08/477,625, filed on Jun. 7, 1995.

(30) Foreign Application Priority Data

Jun. 8, 1994 (JP) .............................................. 6-151693
Sep. 13, 1994 (JP) .............................................. 6-218632

(51) Int. Cl.$^7$ ................................................ H04B 1/66
(52) U.S. Cl. ................................................ 375/240.03
(58) Field of Search .......................... 375/240, 240.15, 375/240.2, 840.03; 382/238, 244; 348/402, 416; 341/67; 358/426; 709/232

(56) References Cited

U.S. PATENT DOCUMENTS

| 4,789,893 | A |   | 12/1988 | Weston ........................ 348/448 |
|---|---|---|---|---|
| 4,903,317 | A | * | 2/1990 | Nishihara et al. ............ 382/244 |
| 5,020,120 | A |   | 5/1991 | Weldy .......................... 382/56 |
| 5,122,873 | A |   | 6/1992 | Golin ........................... 358/133 |
| 5,138,315 | A | * | 8/1992 | Le Queau et al. ............. 341/67 |
| 5,144,423 | A |   | 9/1992 | Knauer et al. ............... 358/133 |
| 5,208,669 | A |   | 5/1993 | Richards ...................... 348/445 |
| 5,216,516 | A | * | 6/1993 | Tanaka et al. ............... 358/426 |
| 5,228,028 | A |   | 7/1993 | Cucchi et al. ............... 370/94.1 |
| 5,305,438 | A |   | 4/1994 | MacKay et al. ............. 345/511 |

(List continued on next page.)

FOREIGN PATENT DOCUMENTS

| EP | 0509576 A2 | 10/1992 |
|---|---|---|
| EP | 0551979 A2 | 7/1993 |
| EP | 0627858 | 12/1994 |
| WO | 92/06563 | 4/1992 |
| WO | 93/20650 | 10/1993 |

OTHER PUBLICATIONS

Standards Conversion Between 1250/50 and 625/50 TV Systems, V. G. Devereux, BBC Research Department UK, pp. 51–55, (IBC, 1992).

(List continued on next page.)

*Primary Examiner*—Chris Kelley
*Assistant Examiner*—Allen Wong
(74) *Attorney, Agent, or Firm*—Wenderoth, Lind & Ponack, L.L.P.

(57) ABSTRACT

An image conversion apparatus for converting and outputting the spatial resolution, temporal resolution, or image quality of compressed image data input thereto is provided. A compression-coded frame-unit image signal An input from the input signal line is changed to real-time image data Rn by an image decoding unit. A image coding unit then converts the real-time image data Rn to compressed image data comprising fewer picture elements and having a different spatial or temporal resolution different from that of the real-time image data Rn.

11 Claims, 24 Drawing Sheets

U.S. PATENT DOCUMENTS

| | | | |
|---|---|---|---|
| 5,408,270 A | | 4/1995 | Lim .......................... 348/429 |
| 5,412,431 A | | 5/1995 | Vogel ......................... 348/405 |
| 5,414,469 A | | 5/1995 | Gonzales et al. ........... 348/408 |
| 5,422,672 A | | 6/1995 | Horst et al. ................. 348/402 |
| 5,446,498 A | | 8/1995 | Boon .......................... 348/448 |
| 5,541,852 A | * | 7/1996 | Eyuboglu et al. ........... 709/232 |
| 5,544,266 A | | 8/1996 | Koppelmans et al. ....... 382/238 |
| 5,555,322 A | | 9/1996 | Terai et al. ................. 382/232 |
| 5,570,199 A | | 10/1996 | Tanaka et al. ............... 386/95 |
| 5,729,293 A | * | 3/1998 | Keesman ............... 375/240.15 |
| 5,818,531 A | * | 10/1998 | Yamaguchi et al. ..... 375/240.2 |

OTHER PUBLICATIONS

ISO/IEC 13818–2 (MPEG II), Generic Coding of Moving Pictures and Associated Audio Information: Video Recommendation H.262, pp.:1–15 (numbered by Examiner).

Ender Ayanoglu et al., "Tandem Transcoding without Distortion Accumulation for Vector Quantization", IEEE Transactions on Communications, vol. 40, No. 2, Feb. 1992, pp. 397–403.

Picture Conversion for HD Graphics, Jun. 13, 1991, Broadcast Sessions, Montreux, pp. 552–558.

* cited by examiner

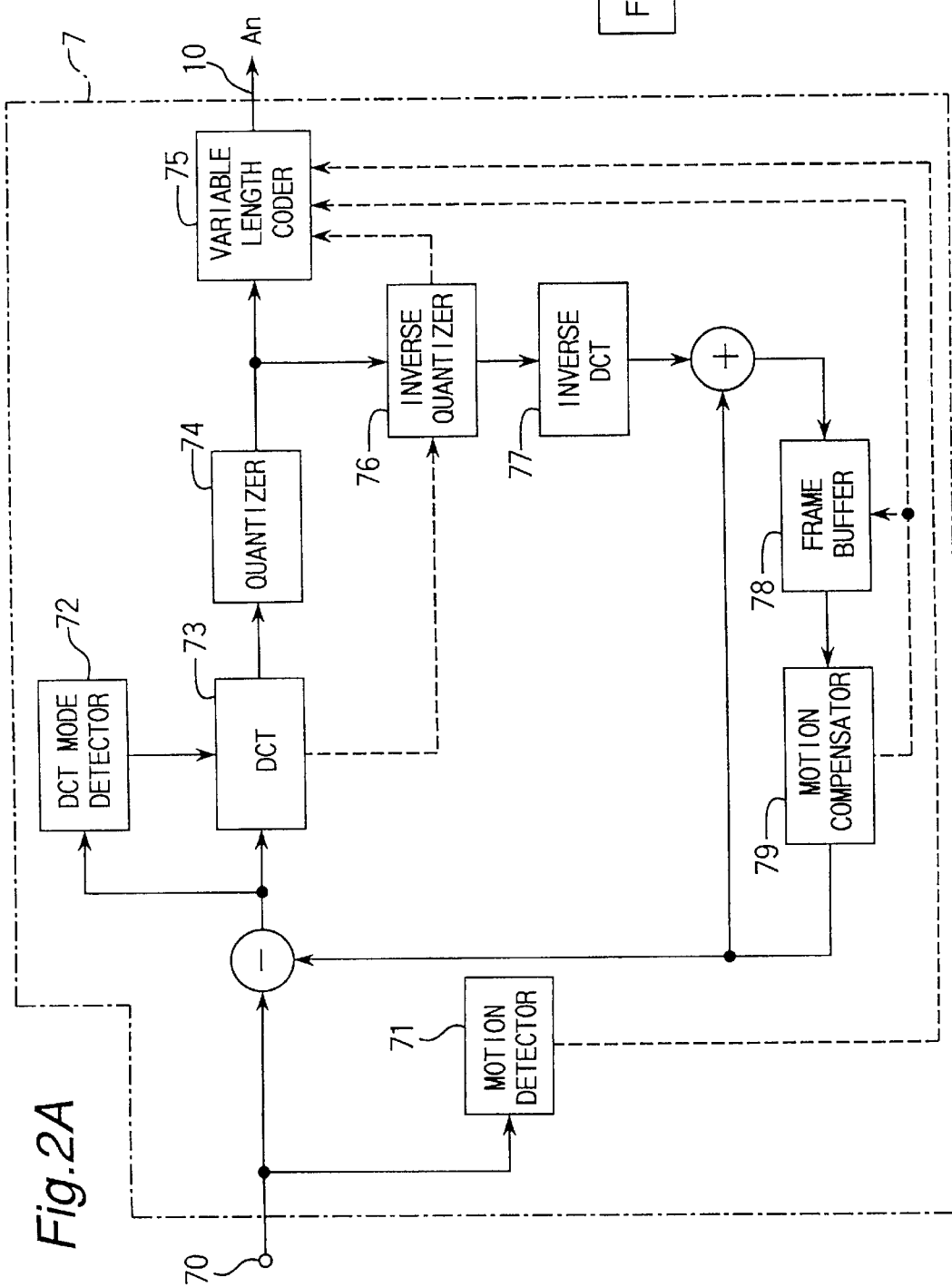

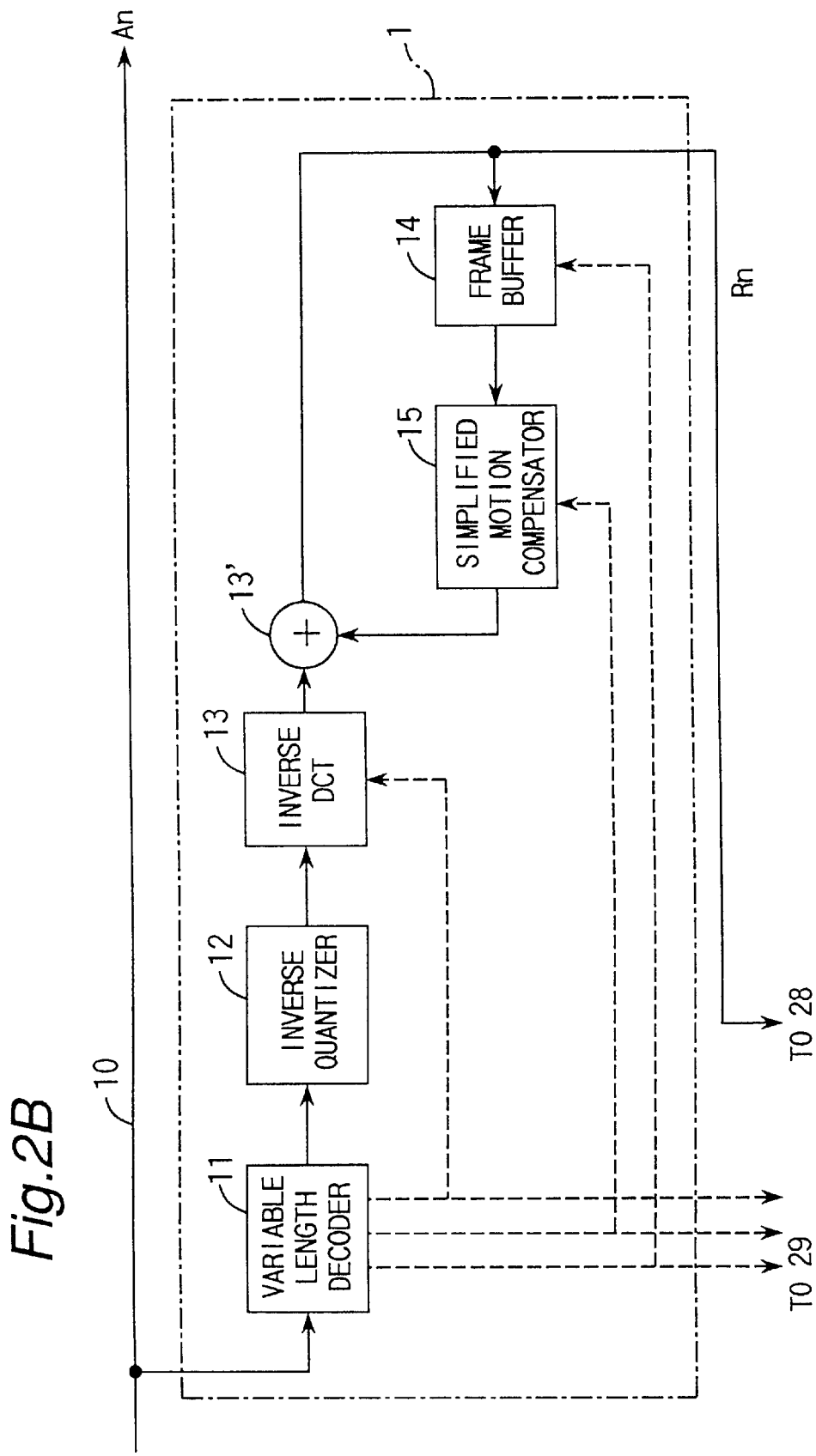

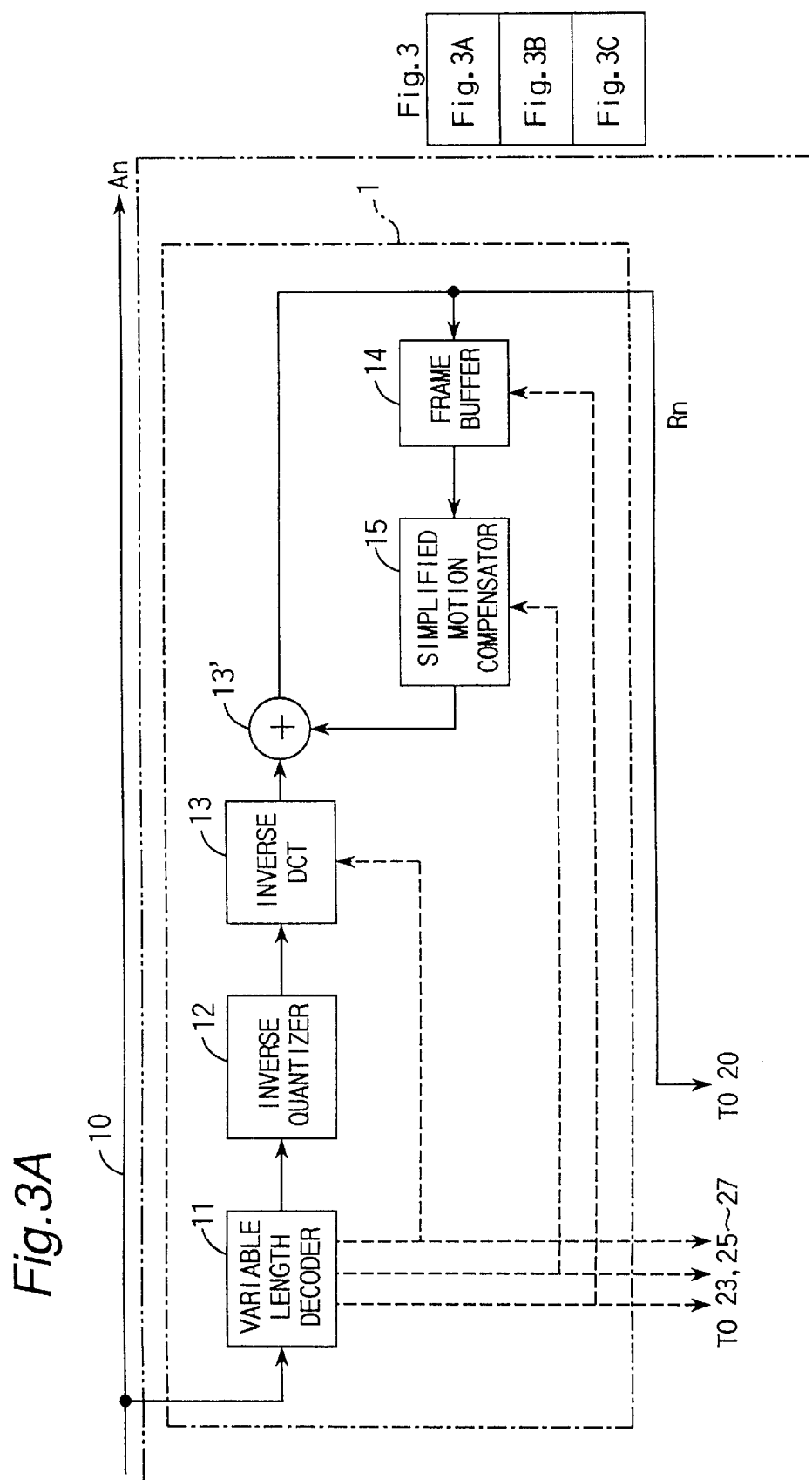

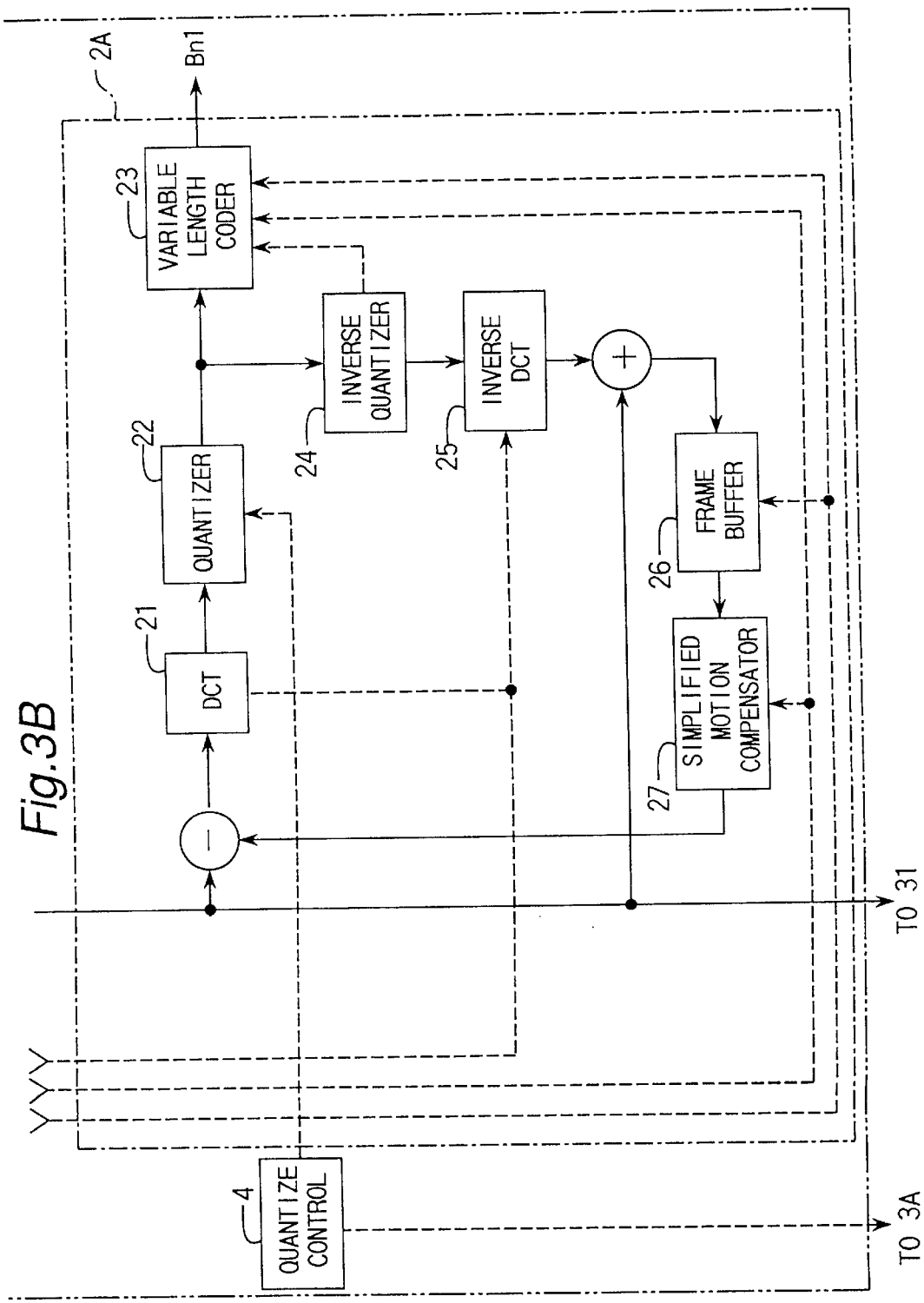

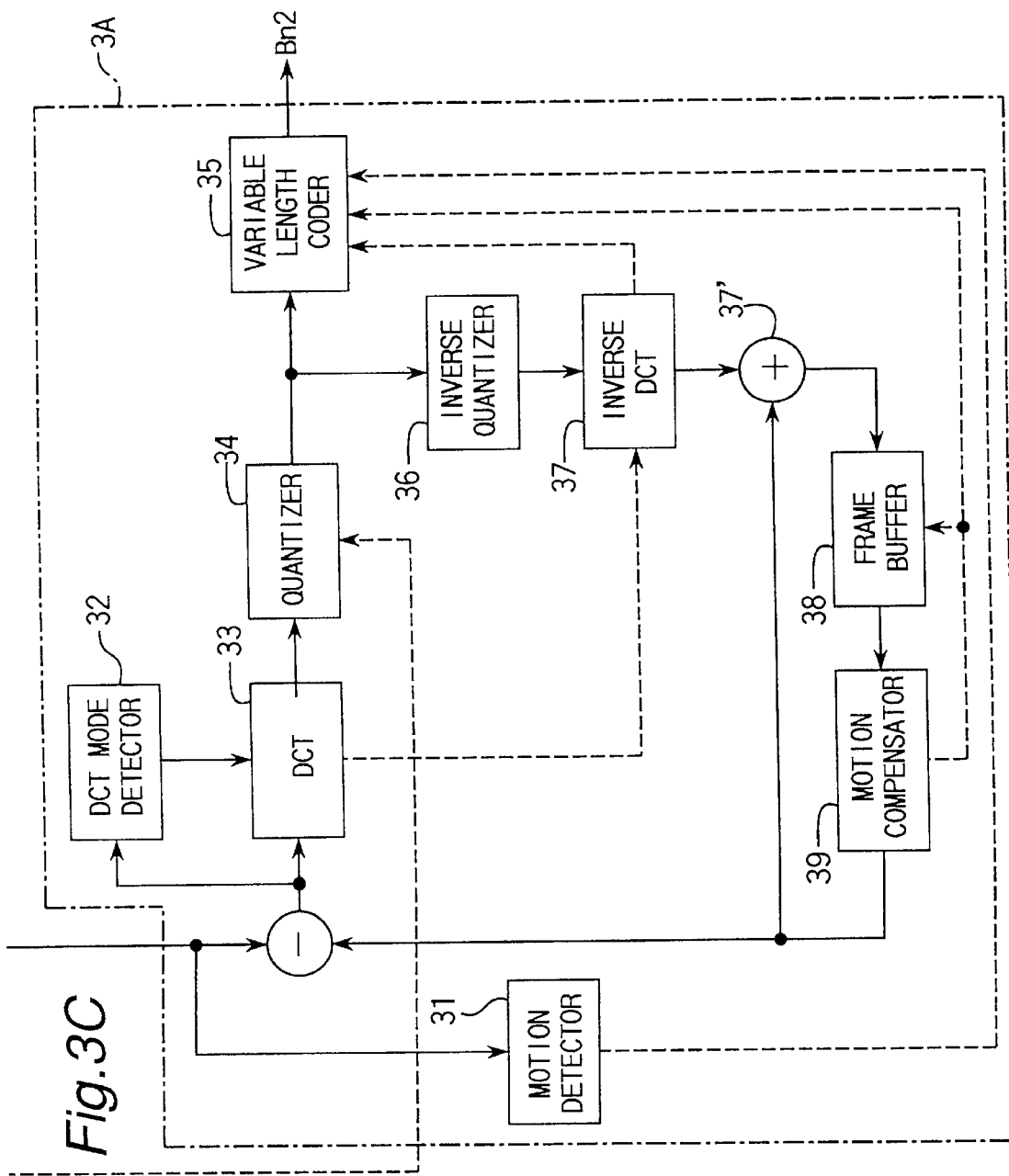

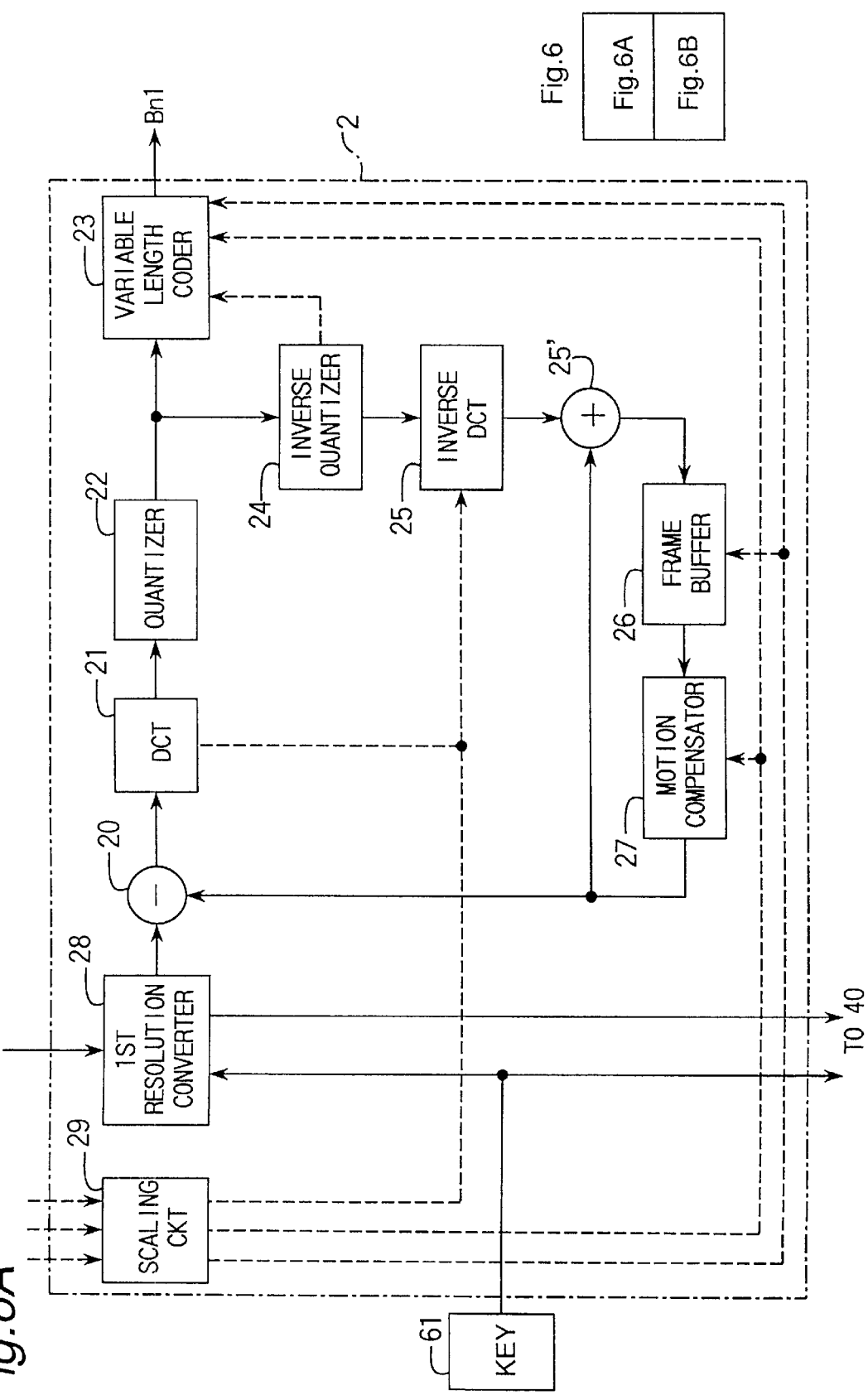

IMAGE CONVERSION APPARATUS FOR TRANSFORMING COMPRESSED IMAGE DATA OF DIFFERENT RESOLUTIONS WHEREIN SIDE INFORMATION IS SCALED

This is a Divisional application of Ser. No. 08/477,625, filed Jun. 7, 1995.

BACKGROUND OF THE INVENTION

1. Field of the Invention

The present invention relates to an image conversion apparatus for converting the spatial resolution, temporal resolution or image quality of compressed image data to obtain compressed image data of a different spatial resolution, temporal resolution or image quality used for transmission or database storage of compressed images.

2. Description of the Prior Art

The massive volume of information carried by digital image signals makes high efficiency coding essential for transmitting or recording digital image signals. Various image compression techniques have therefore been proposed in recent years, and some of these techniques are also scalable. Scalability makes it possible for the user to use images at any desired spatial resolution, temporal resolution, or image quality, and thus enables, for example, both HDTV and standard TV signals to be alternatively received from a single transmission path in response to user requests.

An image coding apparatus (including image conversion apparatuses) using MPEG, a conventional scalable image coding method, is described below with reference to FIGS. 1A and 1B, block diagrams of a conventional MPEG-compatible image coding method. The image coding apparatus comprises a first image coder 7 shown in FIG. 1A, and a second image coder 8 shown in FIG. 1B. The image data size and number of pixels that can be processed by the first image coder 7 differ from those of the second image coder 8. Note that in FIGS. 1A and 1B the signal line indicated by the solid line is the video signal line, and the signal line indicated by the dotted line is the line for signals other than the video signal (including the so-called "side information" described below).

The video (image) signal is an interlace-scanned image input in frame units. The video signal input to input terminal 70 in FIG. 1A is an uncompressed digital video signal. The input image is first input to the first resolution converter 91 shown in FIG. 1B, and converted to an image of half the resolution (number of pixels) both vertically and horizontally. The first frame coded is intraframe coded without obtaining any frame difference value. The input image data is passed through the differencer and applied to the DCT mode evaluator 82 and DCT processor 83. The DCT mode evaluator 82 detects the amount of motion in the image and determines whether frame or field unit DCT should be used by, for example, obtaining the inter-line difference in two-dimensional block units. The result of this operation is input to the DCT processor 83 as the DCT mode information.

The DCT processor 83 applies a DCT in either frame or field unit based on the DCT mode information, and converts the image data to a conversion coefficient. Quantizer 84 quantizes the conversion coefficient supplied from the DCT processor 83, and outputs to the variable length coder 85 and inverse quantizer 86. The variable length coder 85 variable length codes the quantized signal, and outputs the result through the multiplexer 93 shown in FIG. 1A to the transmission path. The quantized conversion coefficient is then inverse quantized by the inverse quantizer 86, and input to the inverse DCT processor 87. The inverse DCT processor 87 restores the input data to real-time image data, and stores the real-time image data to the frame buffer 88.

Because there is usually a high correlation between images, energy is concentrated in the conversion coefficients corresponding to the low frequency component after DCT is applied. As a result, by quantizing the high frequency components to which the human visual system (HVS) is less sensitive with large quantization noise, and quantizing the more important low frequency components with minimal quantization noise, image deterioration can be minimized, and the compressed image data size can be smaller (higher coding efficiency). In addition, the intraframe correlation is high when there is little motion in interlaced images, and when motion is large the inter-frame correlation is low but the intra-field correlation is high. It follows that interlaced images can also be efficiently coded by using this characteristic of interlaced images to appropriately switch between frame and field unit DCT processing.

Images following the intraframe coded frame are then coded by calculating a predicted value for each frame, and then coding the difference between the actual frame value and the predicted value, i.e., coding the prediction error. The coding apparatus typically obtains the image used for predictive coding from the first resolution converter 91, and inputs the image to the motion detector 81; the motion detector 81 obtains the image motion vectors in two-dimensional block units using a common full search method.

The frame buffer 88 and motion compensator 89 then generate predicted values compensating for motion in the next frame in two-dimensional blocks using the motion vectors detected by the motion detector 81. The difference between the predicted value and the actual image input data is calculated to obtain the prediction error, which is coded with the same method used for intraframe coding. The motion vectors used for motion compensation, the motion compensation information expressing the parameters for block unit motion compensation, and the DCT mode information are applied as "side information" to the variable length coder 85, and are transferred to the decoder (not shown in the figures) through multiplexer 93 with the coded coefficient.

Because prediction error is optimally coded by means of the above image coding apparatus, the energy decreases and higher coding efficiency can be achieved in comparison with such direct image data coding schemes as intraframe coding.

In contrast with this, the first image coder 7 (FIG. 1A) is an image compression coder whereby the image resolution is not changed. The first image coder 7 shown in FIG. 1A comprises, similarly to the first image coder 7 in FIG. 1B, a motion detector 71, DCT mode evaluator 72, DCT processor 73, quantizer 74, variable length coder 75, a inverse quantizer 76, inverse DCT processor 77, adder, frame buffer 78, and motion compensator 79.

This image coder 7 essentially compression codes digital image signals in the same way as the second image coder 8, but differs from the second image coder 8 in the ability to use low resolution images to generate the predicted values. Predicted value generation itself is handled by the motion compensator 79, and to accomplish this, the low resolution image of the previous frame stored in the frame buffer 88 is input to the image resolution converter 92 (FIG. 1B) for resolution doubling in both vertical and horizontal directions. The motion compensator 79 then uses an image the same size as the original image obtained by the image resolution converter 92 as one of the predicted value candidates. The motion compensator 79 shown in FIG. 1A calculates the difference between the original image and the predicted value read from the frame buffer 78, and between the original image and the output of the second image resolution converter 92, and selects the smaller difference for input to the DCT processor 73.

By means of the first image coder 7 coding high resolution images as thus described, parts such as low resolution image areas do not need to be coded, and coding efficiency can be increased. The high and low resolution coded images are then multiplexed by the multiplexer 93 and output to the transmission path.

The decoder (not shown in the figures) obtains a low resolution image by extracting and decoding the low resolution coded image data from a single type of coded image data. In addition, by extracting both the high and low resolution coded image data for decoding, the high resolution image data can also be obtained. Depending on the situation, the user can thus switch between receiving low and high resolution images. Such resolution images are explained in MPEG-2 (ISO/IEC JTC1/SC29 N659, "ISO/IEC CD 13818-2: Information technology—Generic coding of moving pictures and associated audio information—Part 2: Video", 1993.12).

For example, multiplexer 93 produces a multiplexed signal containing a HDTV signal from the variable length coder 75 and a standard TV signal from the variable length coder 85.

According to the prior art, the image coders 7 and 8 shown in FIGS. 1A and 1B may be provided at the television broadcasting station. In this case, the television broadcasting station will need to prepare both a HDTV signal and a standard TV signal for the same television program.

Achieving scalability with the above image coding method faces with the following problems, however.

First, the quality of high resolution images deteriorates. If the transmission rate of low resolution compressed image data is b, and that of high resolution compressed image data is c, the combined transmission rate a of images compressed by means of this conventional coding method will be a=b+c. Tests have shown that when the image quality of decoded images is compared between images coded using all of transmission rate a for the high resolution compressed images, and images coded using transmission rates b and c to separately code compressed image data of two different resolutions, the quality of the image coded using all of transmission rate a is clearly superior.

Second, the decoding apparatus on the receiving side becomes more complex. More specifically, it is not possible to decode high resolution compressed image data with the conventional coding method without using separate decoders for the high and low resolution images.

SUMMARY OF THE INVENTION

Therefore, an object of the present invention is to provide an image conversion apparatus whereby a decoding apparatus of simple constitution, free of image deterioration, and having scalability can be achieved.

To achieve the aforementioned object, an image conversion apparatus according to the present invention comprises an image decoder for decoding and restoring to real-time image data Rn one or more compressed image data An (where n is a positive integer) containing compressed frame-unit video signals and input to the image decoder; and an image coder for converting the real-time image data Rn input thereto from the image decoder to one or more types of compressed image data Bn each having a different spatial resolution, and outputting the compressed image data Bn.

An image conversion apparatus according to the present invention comprises an image decoder for decoding and restoring to real-time image data Rn one or more compressed image data An (where n is a positive integer) containing compressed frame-unit video signals and input to the image decoder; and an image coder for converting the real-time image data Rn input from the image decoder to one or more types of compressed image data Bn each having a different temporal resolution, and outputting the compressed image data Bn.

An image conversion apparatus according to the present invention comprises an image decoder for decoding and restoring to real-time image data Rn one or more compressed image data An (where n is a positive integer) containing compressed frame-unit video signals and input to the image decoder; and an image coder for converting the real-time image data Rn input from the image decoder to one or more types of compressed image data Bn each having a different quantization level, and outputting the compressed image data Bn.

An image conversion apparatus according to the present invention is one of the preceding three embodiments further characterized by compressing the image data using side information, which is not image data, obtained by decoding the compressed image data An during the process converting and compressing the real-time image data Rn to the compressed image data Bn.

An image conversion apparatus according to the present invention comprises a storage means for storing one or more compressed image data An (where n is a positive integer) containing compressed frame-unit video signals; and an image coder for converting the compressed image data An input thereto from the storage means to one or more types of compressed image data Bn each having a different spatial resolution, and outputting the compressed image data Bn.

An image conversion apparatus according to the present invention comprises a storage means for storing one or more compressed image data An (where n is a positive integer) containing compressed frame-unit video signals; and an image coder for converting the compressed image data An input thereto from the storage means to one or more types of compressed image data Bn each having a different temporal resolution, and outputting the compressed image data Bn.

An image conversion apparatus according to the present invention comprises a storage means for storing one or more compressed image data An (where n is a positive integer) containing compressed frame-unit video signals; and an image coder for converting the compressed image data An input thereto from the storage means to one or more types of compressed image data Bn each having a different quantization level in the orthogonal transform coefficient, and outputting the compressed image data Bn.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input thereto from the image decoder to compressed image data Bn1 . . . Bnk each having a different spatial resolution, and outputting compressed image data Bn1 . . . Bnk; and a selector for alternatively selecting the image data of the image decoder and first through k image coders.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input from the image decoder to compressed image data Bn1 ... Bnk each having a different temporal resolution, and outputting compressed image data Bn1 ... Bnk; and a selector for alternatively selecting the image data of the image decoder and first through k image coders.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input from the image decoder to compressed image data Bn1 ... Bnk each having a different quantization level, and outputting compressed image data Bn1 ... Bnk; and a selector for alternatively selecting the image data of the image decoder and first through k image coders.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input from the image decoder to compressed image data Bn1 ... Bnk each having a different temporal resolution, and outputting compressed image data Bn1 ... Bnk; and a request input terminal for inputting a control signal setting the resolution of the first through k image coders to a particular value.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input from the image decoder to compressed image data Bn1 ... Bnk each having a different spatial resolution, and outputting compressed image data Bn1 ... Bnk; and a request input terminal for inputting a control signal setting the resolution of the first through k image coders to a particular value.

An image conversion apparatus according to the present invention comprises an image decoder for decoding and restoring to real-time image data Rn one or more compressed image data An (where n is a positive integer) containing compressed frame-unit video signals and input to the image decoder; first through k image coders for converting the real-time image data Rn input from the image decoder to compressed image data Bn1 ... Bnk each having a different quantization level, and outputting compressed image data Bn1 ... Bnk; and a request input terminal for inputting a control signal setting the quantization level of the first through k image coders to a particular value.

An image conversion apparatus according to the present invention comprises a variable length decoder for variable length decoding one or more compressed image data An (where n is a positive integer) containing compressed frame-unit video signals and input to the variable length decoder, and generating a conversion coefficient; plural coefficient selectors for selecting from among the conversion coefficients output by the variable length decoder the conversion coefficient corresponding to the desired image resolution; and plural variable length coders for variable length coding the data of the plural coefficient selectors.

In the image conversion apparatus according to the invention as described above, the compressed image data An of the frame-unit image signals is input to the image decoder for decoding and re-conversion to the real-time image data Rn. When this real-time image data Rn is then input from the image decoder, the image coder converts the input data to one or more types of compressed image data Bn, each of which has a different spatial resolution, temporal resolution, or quantization level.

In the image conversion apparatuses according to the invention as described above, the image decoder reads the compressed image data An of the frame-unit image signals from the storage means for decoding and re-conversion to the real-time image data Rn. When this real-time image data Rn is then input from the image decoder, the image coder converts the input data to one or more types of compressed image data Bn, each of which has a different spatial resolution, temporal resolution, or quantization level. As a result, plural images of different converted resolutions can be read by storing only one type of high resolution compressed image data in the storage means.

In the image conversion apparatuses according to the invention as described above, the compressed image data An of the frame-unit image signals is input to the image decoder for decoding and re-conversion to the real-time image data Rn. When this real-time image data Rn is then input from the image decoder, the image coder converts the input data to one or more types of compressed image data Bn, each of which has a different spatial resolution, temporal resolution, or quantization level. When the compressed image data is then decoded on the receiver side, the selector. is appropriately switched to select the compressed image data for decoding and outputting images of a particular resolution. It is therefore possible to transfer the image data without increasing the transfer rate.

In the image conversion apparatuses according to the invention as described above, the compressed image data An of the frame-unit image signals is input to the image decoder for decoding and re-conversion to the real-time image data Rn. When this real-time image data Rn is then input from the image decoder, the image coder converts the input data to one or more types of compressed image data Bn at the resolution input from the request input terminal.

In the image conversion apparatuses according to the invention, the conversion coefficients decoded by the variable length decoder can be selected according to the resolution of the image to be reproduced.

As described above, the image quality on the reproduction side does not deteriorate because high resolution compressed image data can be transferred using the allowable limits of the transfer rate. Furthermore, because compressed image data of a particular resolution can be selected and output, the constitution of the decoding apparatus is also simplified. Normally, decoding apparatuses that can decode high resolution images can also decode low resolution images, and compressed image data coded using the image conversion apparatus of the present invention can therefore also be decoded by means of a single decoding apparatus for high resolution images.

BRIEF DESCRIPTION OF THE DRAWINGS

The present invention will become more fully understood from the detailed description given below and the accompanying diagrams wherein:

FIGS. 2A, 2B, 2C and 2D taken together as shown in FIG. 2 show a block diagram of the image conversion apparatus of the first embodiment of the present invention;

FIGS. 3A, 3B and 3C taken together as shown in FIG. 3 show views similar to FIGS. 2B, 2C and 2D, respectively, but are for the image conversion apparatus of the second embodiment of the present invention;

FIGS. 6A and 6B taken together as shown in FIG. 6 show views similar to FIGS. 2C and 2D, respectively, but are for the image conversion apparatus of the fifth embodiment of the present invention;

DESCRIPTION OF PREFERRED EMBODIMENTS

Figure 1A:
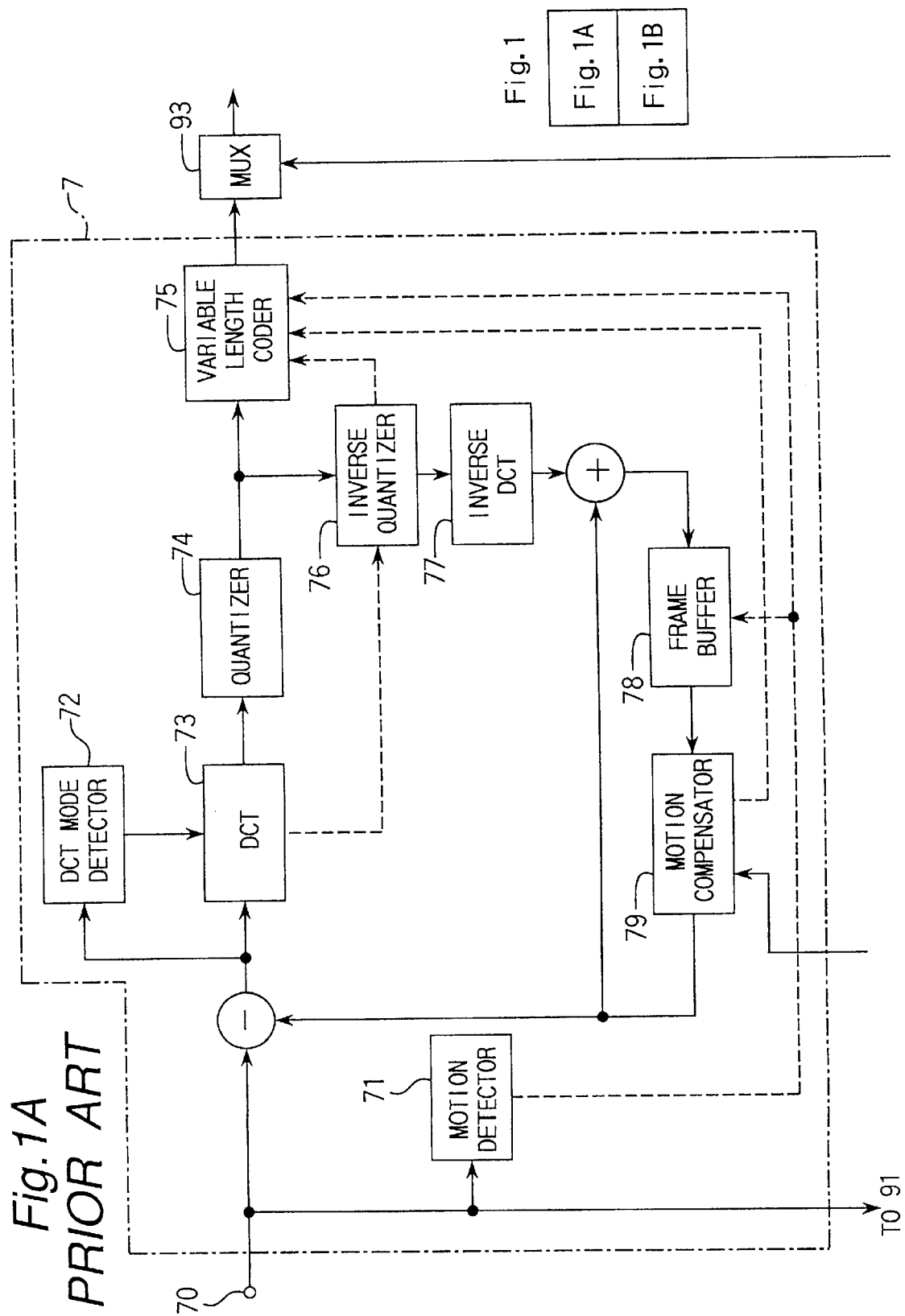
FIGS. 1A and 1B taken together as shown in FIG. 1 show a block diagram of the image conversion apparatus according to the prior art.
Figure 1B:
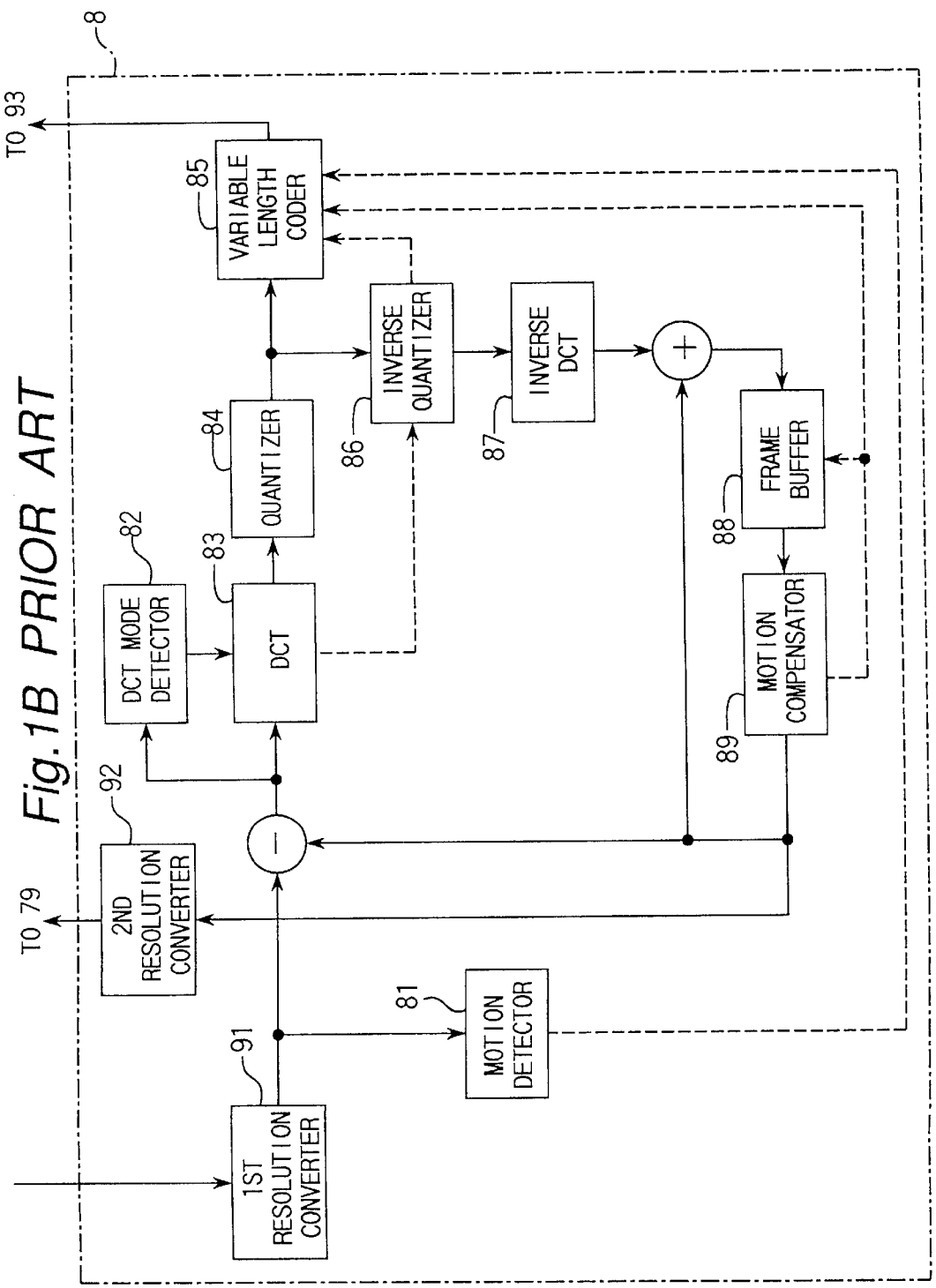
Figure 2C:
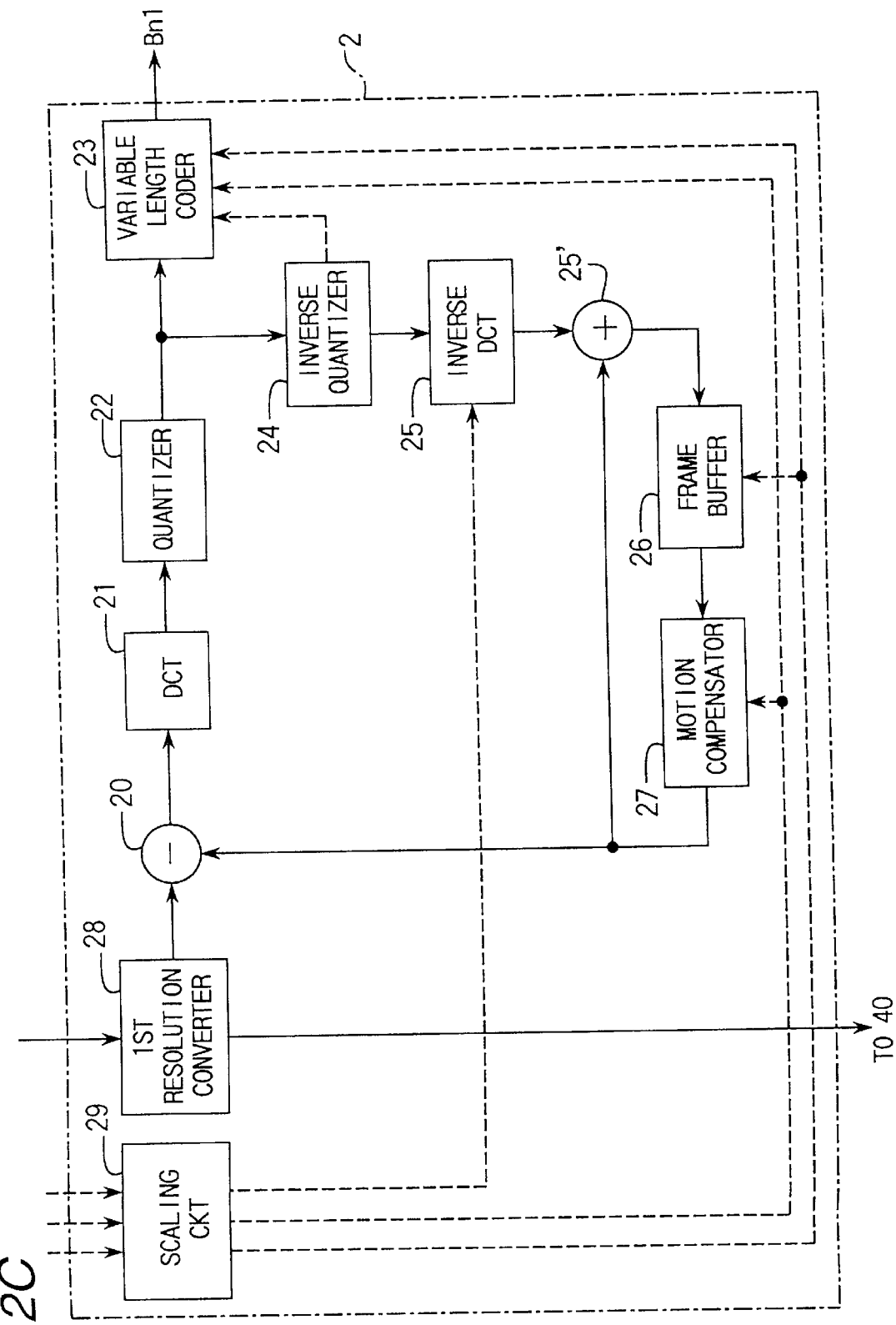
Figure 2D:
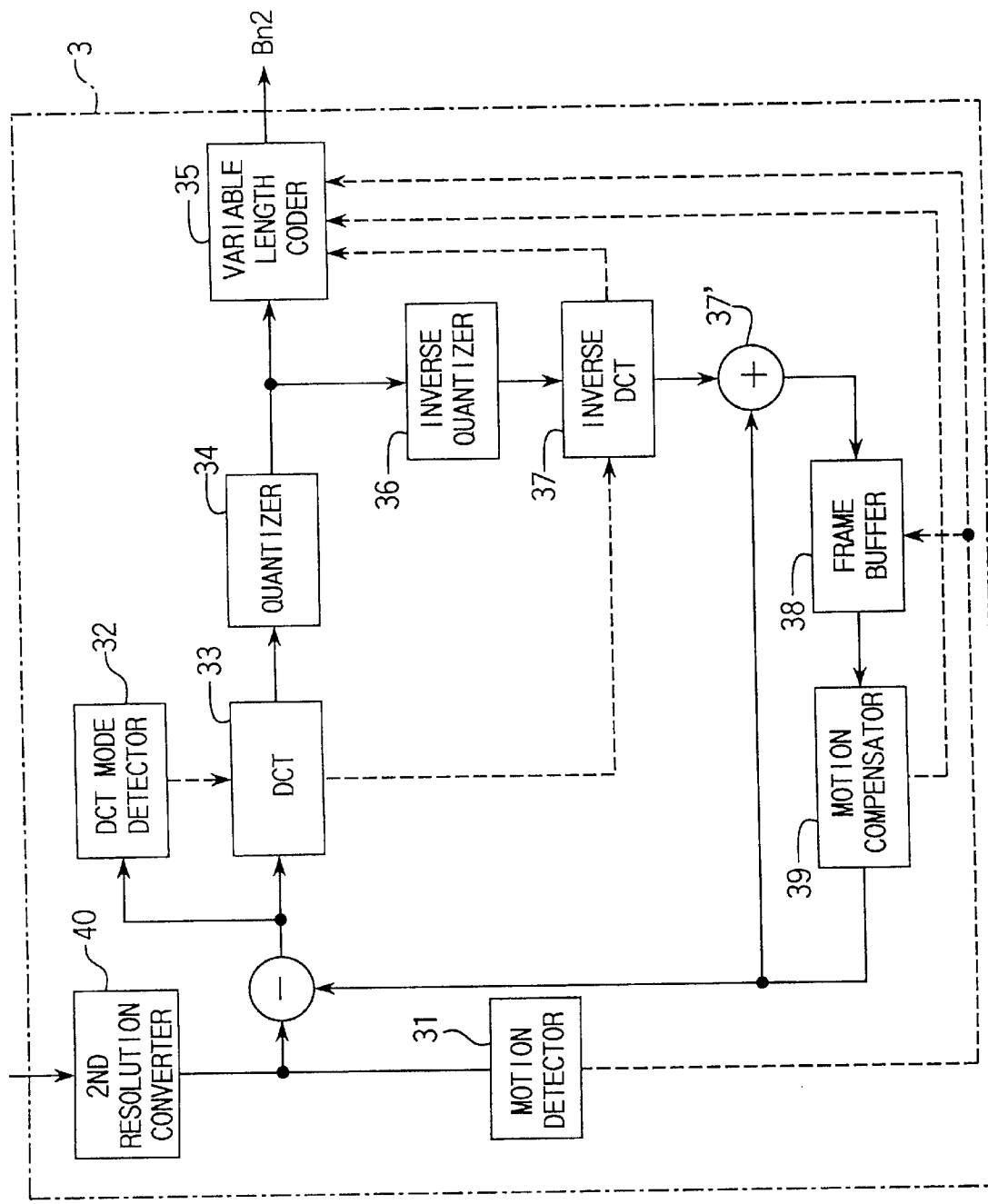

The first embodiment of an image conversion apparatus according to the present invention is described below with reference to FIGS. 2A, 2B, 2C and 2D taken together as shown in FIG. 2. FIG. 2A is a block diagram of an image coding unit 7, which is substantially the same as that shown in FIG. 1A; FIG. 2B is a block diagram of the image decoding unit 1; FIG. 2C is a block diagram of the first image coding unit 2; and FIG. 2D is a block diagram of the second image coding unit 3.

According to the present invention, it may be so arranged that the television broadcasting station can be installed only with the arrangement shown in FIG. 2A to prepare and broadcast only the HDTV signal, which is the compression-coded high resolution image data An (where n is a positive integer). A suitable transducer shown in FIGS. 2B, 2C and 2D may be located outside the broadcasting station, so that the transducer produces not only the HDTV signal An from line 10, but also standard TV signal Bn1 and coarse TV signal Bn2 for the same television program for a variety of end users. It is noted that the circuit of FIG. 2A can be provided at an on-demand service center or at a network service. The transducer is described in detail below with reference to FIGS. 2B, 2C and 2D.

Referring to FIG. 2B, the compression-coded high resolution image data An, such as for the HDTV signal, is transferred by means of signal line 10. The image decoding unit 1 decodes the compressed image data transferred by said signal line 10 to convert the compressed image data to the original real-time image data Rn. Similar to a common image decoder, the image decoding unit 1 comprises a variable length decoder 11, inverse quantizer 12, inverse DCT processor 13, adder 13', frame buffer 14, and simplified motion compensator 15.

The high resolution digital image signal Rn decoded by the image decoding unit 1 is input to the first image coding unit 2 (FIG. 2C), which generates compressed image data Bn1, converted to a first resolution, such as for the standard TV signal. It is to be noted that the hardware configuration of the image coding unit 2 is simpler than that of a common image coder, the first image coding unit 2 specifically comprising subtractor 20, DCT processor 21, quantizer 22, variable length coder 23, inverse quantizer 24, inverse DCT processor 25, adder 25', frame buffer 26, simplified motion compensator 27, a first resolution converter 28, and scaling circuit 29.

The high resolution digital image signal decoded by the image decoding unit 1 is input through the first resolution converter 28 to the second image coding unit 3 (shown in FIG. 2D) for generating the compressed image data Bn2, converted to a second resolution, such as for the coarse TV signal. The second image coding unit 3 outputs compressed image data having an image data size (measured by the number of horizontal and vertical picture elements) smaller than that obtained by the first image coding unit 2. Compared with the first image coding unit 2, the second image coding unit 3 is designed for image quality, and comprises a motion detector 31, DCT mode evaluator 32, and motion compensator 39 in addition to the DCT processor 33, quantizer 34, variable length coder 35, inverse quantizer 36, inverse DCT processor 37, adder 37', frame buffer 38, and second resolution converter 40.

The resolution converter is disclosed in U.S. Pat. No. 4,789,893 to Weston; U.S. Pat. No. 5,446,498; and STANDARDS CONVERSION BETWEEN 1250/50 AND 625/50 TV SYSTEMS from BBC Research Department UK, the entire content of which are expressly incorporated by reference herein.

The operation of the image conversion apparatus according to the first embodiment of the present invention thus comprised is described next below. It is here assumed that the high resolution compressed image data An from the circuit of FIG. 2A is input to the image conversion apparatus through signal line 10 as shown in FIG. 2B.

The compressed image data An is output along the signal line 10, but it is simultaneously input to the image decoding unit 1 for re-conversion to real-time image data. Specifically, the variable length decoder 11 variable length decodes the compressed image data and decodes the side information. The decoded image data is then inverse quantized by the inverse quantizer 12. The inverse DCT processor 13 executes an inverse DCT operation in frame or field units based on the DCT mode information contained in the side information, and generates a conversion coefficient. The result of this operation is restoration of the image data to real-time image data.

Because this data is coded differentially, the frame buffer 14 and motion compensator 15 then generate a predictive image using the motion vector and motion compensation mode information contained in the side information. This predicted image is then added to the output data from the inverse DCT processor 13 to generate the decoded real-time image data. The structure of the motion compensator 15 is simple compared with the structure of the motion compensators 79 and 89 of the image coding apparatus according to the prior art. This is because it is not necessary to provide the image decoding unit 1 with circuitry for selecting the appropriate motion compensation mode, i.e., a square error calculator, because the motion compensation mode is already determined by the coding apparatus on the transmission side, and the predictive image can be simply generated according to the motion compensation mode information decoded from the compressed image data.

The resolution of the decoded image data is then reduced one-half (½) both vertically and horizontally by the first resolution converter 28 (FIG. 2C). The reduced-resolution image is compression coded by a method of the prior art. However, the side information obtained during data decoding, including the DCT mode information, motion compensation information, and motion vector information, is applied to the scaling circuit 29 whereby the information is scaled and used for coding. This side information is obtained for image blocks or other image units of a predetermined size. As a result, if for example the image resolution is reduced to ¼ the original image resolution, the side information for four high resolution image blocks corresponds to one low resolution image block.

Scaling is possible by, for example, interpolating a central value from the mean, mode, and median of the target blocks (four blocks in this example) and surrounding blocks. The hardware configuration can thus be simplified and a simplified motion compensator used because the motion detector is made unnecessary by using the decoded and extracted side information for coding.

The output Rn of the first resolution converter 28 is also input to the second resolution converter 40 shown in FIG. 2D, and the resolution is thereby reduced by a further ½ vertically and horizontally. The output of the second resolution converter 40 is used to generate the compressed image data using a method of the prior art. The second image coding unit 3 differs from the first image coding unit 2 in that it recalculates the side information. While the first image coding unit 2 scales the decoded and extracted side information and uses the scaled side information for coding, error occurs because this side information is not strictly obtained using a low resolution image, and this side information can become a cause of image deterioration particularly when the compression ratio is high. It is possible, however, to prevent image deterioration by recalculating the side information as in the second image coding unit 3. Thus, the first and second image coding units 2 and 3 are mutually complementary, the first image coding unit 2 simplifying the hardware configuration and the second image coding unit 3 emphasizing image quality, and can therefore be used selectively as required.

High resolution images can thus be efficiently coded by means of the embodiment described above because coding is possible using all of the allotted transfer rate a. Furthermore, because the high resolution compressed image input data is output as is while also outputting the image data converted to plural low resolution compressed image data, both high and low resolution images can be decoded using a single high resolution decoding apparatus.

It is noted that the first and second resolution converters 28 and 40 are provided for converting the spatial resolution. Instead of the spatial resolution converters 28 and 40, it is possible to employ temporal resolution converters. Such a temporal resolution converter is disclosed in MPEG-2, which is expressly incorporated by reference herein.

The second embodiment of an image conversion apparatus according to the invention is described below with reference to FIGS. 3A, 3B and 3C. It is to be noted that FIGS. 3A, 3B and 3C show corresponding portions of FIGS. 2B, 2C and 2D, respectively, of the first embodiment, and that the circuit of FIG. 2A can be connected to the circuit of FIG. 3A as a source of the compressed image data An. Specifically, FIG. 3A is a block diagram of the image decoding unit 1 of the image conversion apparatus in the second embodiment of the invention, and is substantially the same as that shown in FIG. 2B; FIG. 3B is a block diagram of the quantization controller 4 and first image coding unit 2A; and FIG. 3C is a block diagram of the second image coding unit 3A.

This second embodiment differs from the first embodiment in that a quantization controller 4 is provided in place of the resolution converters 28 and 40. Whereas the high resolution compressed image data is converted to low resolution compressed image data in the image conversion apparatus according to the first embodiment, the transfer rate is converted by changing the quantization level according to the first and second image coding units 2A and 3A to control the image quality while holding the resolution constant in this second embodiment. Image quality deteriorates when the quantization level is reduced, but communication costs can be reduced because the transfer rate simultaneously drops. This second embodiment thus achieves the effects of the first embodiment above while also enabling control of the transfer rate.

Variations and modifications of the second embodiment, particularly the circuit portion enclosed by a double dot dash line shown in FIGS. 3A and 3B, will be further described later in connection with FIGS. 8–19.

Figure 4:
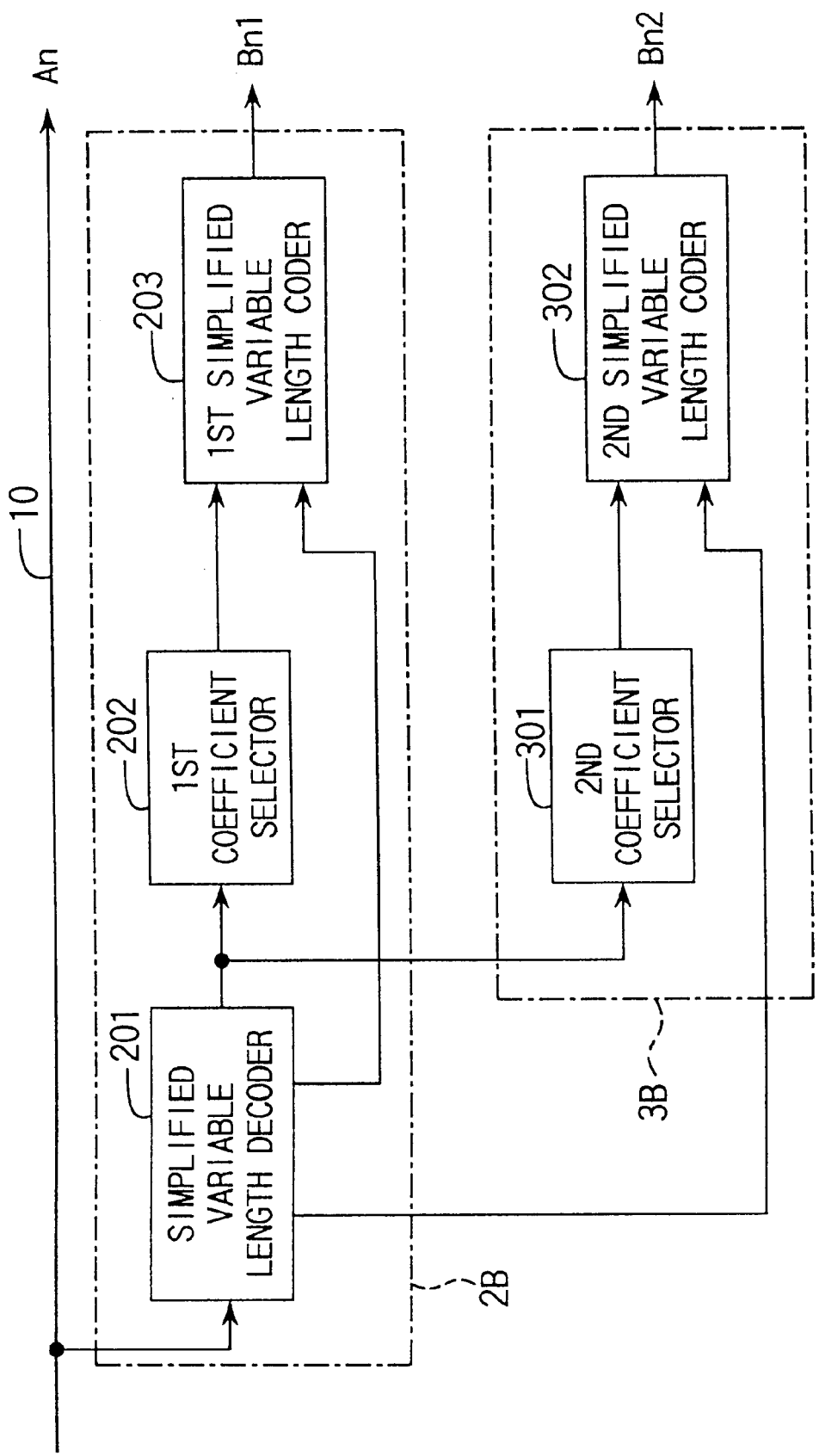
FIG. 4 is a block diagram of an image conversion apparatus according to the third embodiment of the present invention.

The third embodiment of an image conversion apparatus according to the invention is described below with reference to FIG. 4. As shown in FIG. 4, the image conversion apparatus comprises a first image coding unit 2B and a second image coding unit 3B. The circuit of FIG. 2A can be connected is to the circuit of FIG. 4 as a source of the compressed image data An.

This first image coding unit 2B selects the first coefficient (e.g., the low frequency coefficient) from the DCT conversion coefficients in the compressed digital image data input thereto from the signal line 10, and generates the compression-coded image data. The second image coding unit 3B selects the second coefficient (e.g., the conversion coefficient whereby the pixel count is reduced) from the image data input from the first image coding unit 2B, and likewise generates the compression-coded image data.

The first image coding unit 2B comprises a simplified variable length decoder 201, a first coefficient selector 202, and a first simplified variable length coder 203. The second image coding unit 3B comprises a second coefficient selector 301 and a second variable length coder 302.

The operation of an image conversion apparatus thus comprised is described below. As does the second embodiment described above, this third embodiment outputs compressed image data of different image quality levels, but controls the image quality by selecting the DCT coefficient of the high resolution compressed image data. DCT may be thought of as a type of frequency analysis; as a result, the lower the frequency to which the DCT coefficient (vertical and horizontal) corresponds, the more sensitive the HVS is to data loss, and the greater the effect on the human visual perception of image quality.

The compressed image data is input from the signal line 10 to the simplified variable length decoder 201 for decoding only the DCT coefficient part. The first coefficient selector 202 leaves only the coefficients corresponding to the low frequencies, and abandons the other coefficients. For example, when there are 64 coefficients (8 horizontal and 8 vertical), the first coefficient selector 202 selects only 25 coefficients, specifically the 5×5 horizontal and vertical coefficients starting from the low frequency component, and abandons the remaining coefficients. The first simplified variable length coder 203 variable length codes these 25 coefficients again, converting the data to compressed image data with a reduced transfer rate for output. When there are, for example, 16 coefficients (4×4 vertically and horizontally), the second image coding unit 3B selects only four coefficients, specifically the 2×2 horizontal and vertical coefficients starting from the low frequency component, and abandons the remaining coefficients.

It is therefore possible by means of this embodiment to achieve the same effects as the second embodiment above by means of an even simpler configuration.

The fourth embodiment of an image conversion apparatus according to the invention is described below with reference to FIG. 5, which shows a modification of the circuit of FIG. 2B. In the first embodiment, the source of the compressed image data An is provided by the circuit of FIG. 2A, but in this embodiment, the compressed image data An is provided from a memory of storage unit 5. When compared with the first embodiment shown in FIGS. 2A–2D, the only difference is that the fourth embodiment has a storage unit 5, instead of the circuit shown in FIG. 2A, as a source of compressed image data An.

Figure 5:
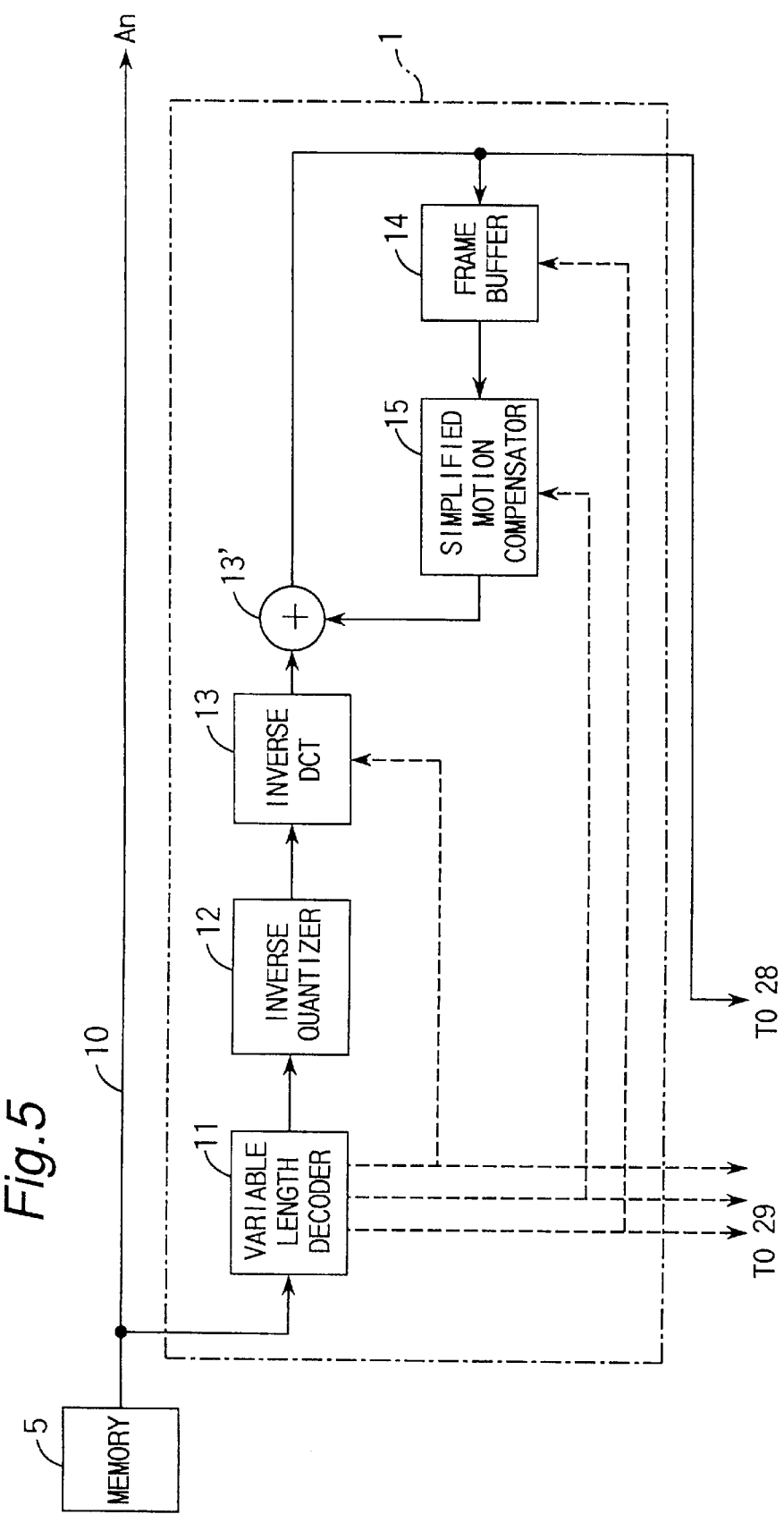
FIG. 5 show a block diagram similar to that shown in FIG. 2B, but is for the image conversion apparatus of the third embodiment of the present invention.

The storage unit 5 shown in FIG. 5 is a database for storing the compressed image data An, and is comprised of, for example, a large-capacity digital signal recording and reproducing apparatus and an optical disk apparatus.

The image decoding unit 1 decodes the compressed image data reproduced from the storage unit 5, and restores the compressed image data to the original real-time digital image data. The structure and operation thereafter is the same as the first embodiment.

Whereas the high resolution compressed image data is input from a transmission path (signal line 10) from the circuit of FIG. 2A in the first embodiment, the high resolution compressed image data is stored to the storage unit 5 in the present embodiment. The stored compressed image data can therefore be read as required for conversion and output at a desired resolution, and image data of various output resolutions can thus be obtained.

If the database (storage unit 5) were to store discretely compressed image data for each of the resolutions reproducible in the scalable range of resolutions, the database would require a massive storage capacity. This problem is avoided in the present embodiment of the invention, however, because high image quality, low resolution compressed image data can be output by means of a simple conversion process from the high resolution compressed image data, and it is therefore sufficient to store only the high resolution compressed image data in the storage unit 5.

Figure 6B:
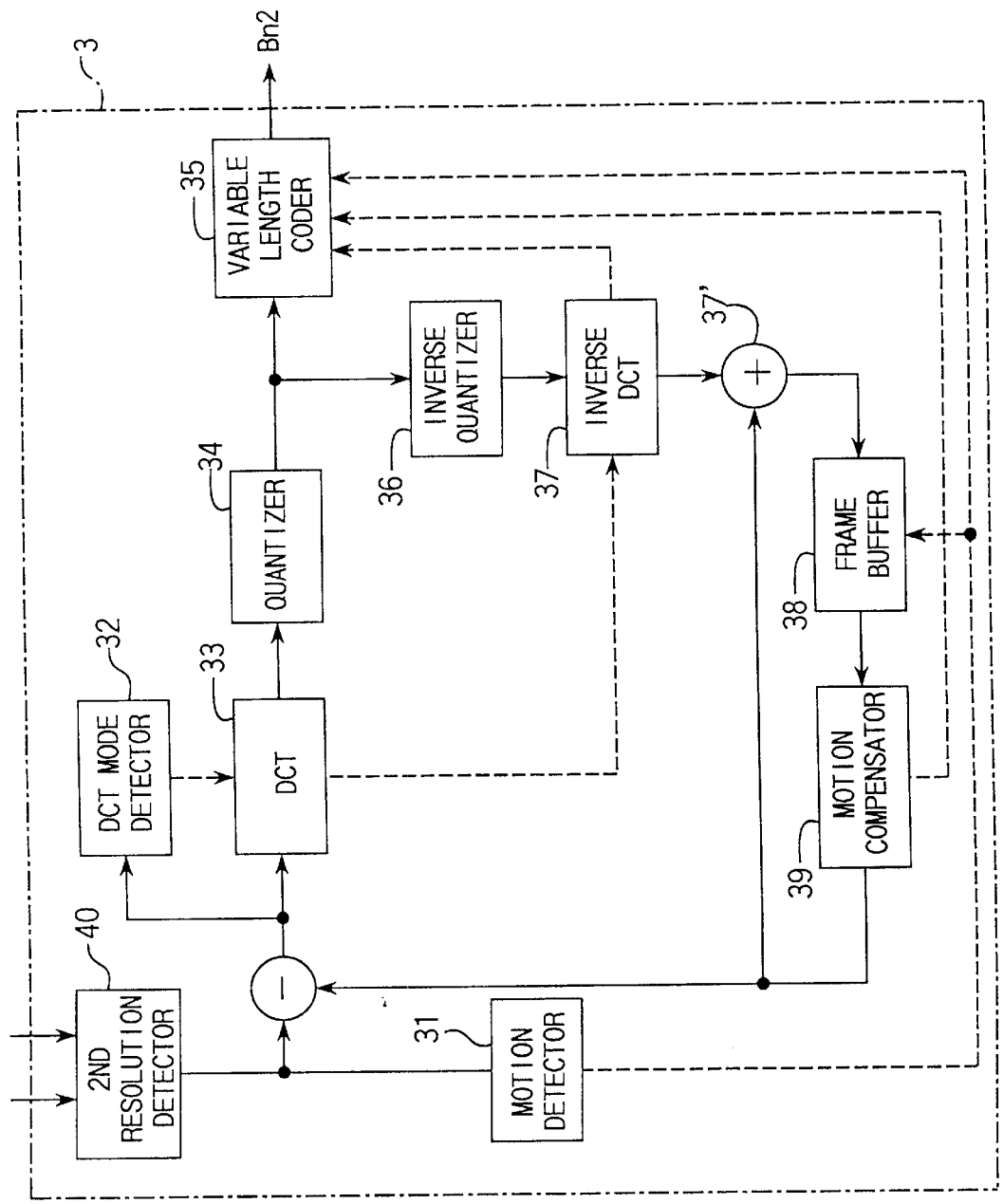

The fifth embodiment of an image conversion apparatus according to the invention is described below with reference to FIGS. 6A and 6B. It is to be noted that FIGS. 6A and 6B show corresponding portions of FIGS. 2C and 2D, respectively, of the first embodiment, and that the circuit of FIGS. 2A and 2B can be connected to the circuit of FIG. 6A to complete the entire structure of the fifth embodiment. Specifically, FIG. 6A is a block diagram of the first image coding unit 2; and FIG. 6B is a block diagram of the second image coding unit 3. The only difference of the fifth embodiment with respect to the first embodiment is that the fifth embodiment has a key input device 61 to manually change the resolution level of the first and second resolution converters 28 and 40.

A control signal specifying the resolution of the converted image is generated by a key input device 61, and is applied to the first resolution converter 28 (FIG. 6A) and to the second resolution converter 40 (FIG. 6B). Whereas in the first embodiment above the resolution is converted to ½ and ¼, respectively, by the first and second resolution converters 28 and 40, the resolution can be changed in the present embodiment in response to a user request.

It is therefore possible for the user to obtain compressed image data at the desired resolution within the reproducible resolution limits.

Figure 7:
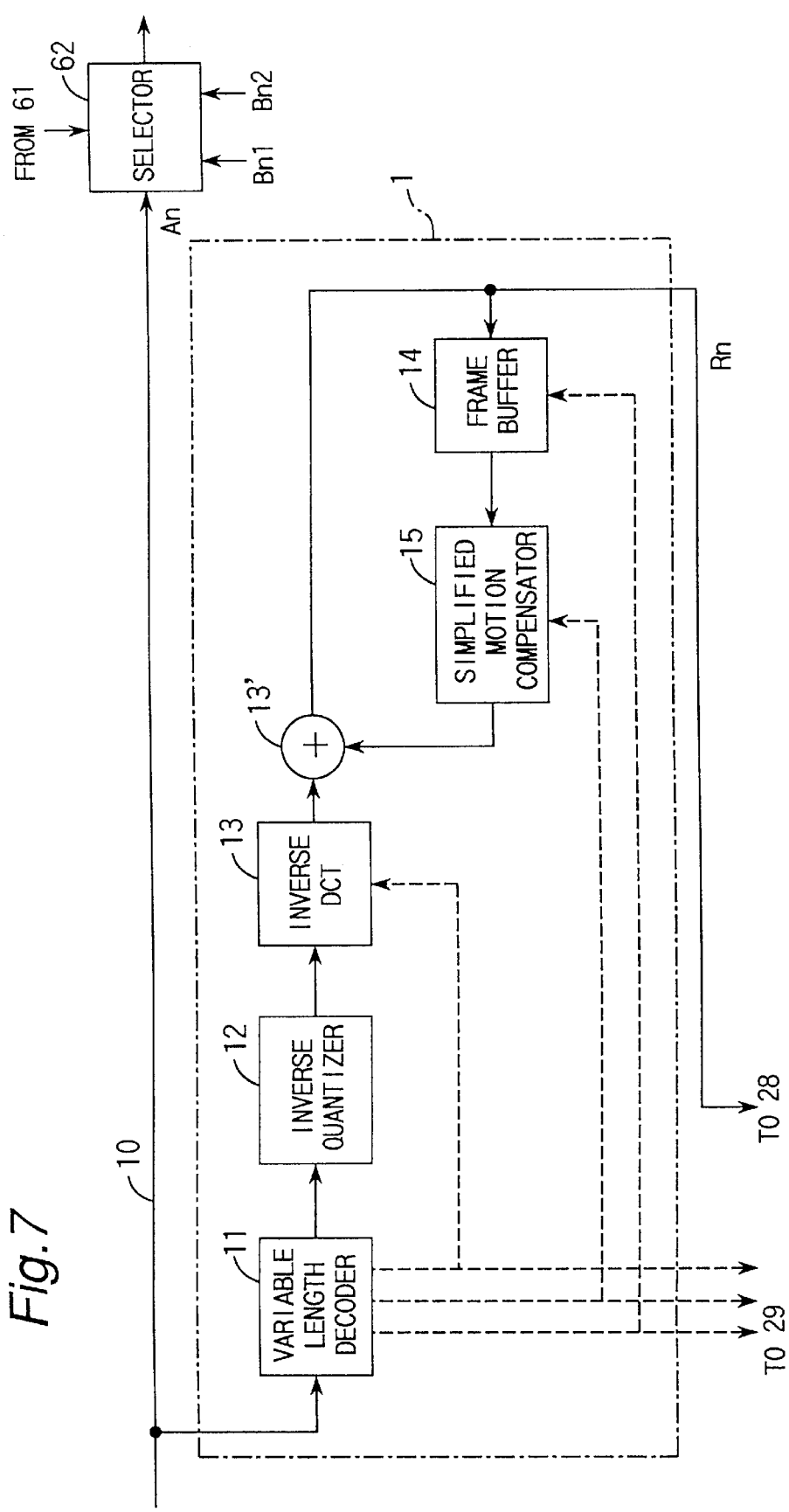
FIG. 7 show a block diagram similar to that shown in FIG. 2B, but is for the image conversion apparatus of the sixth embodiment of the present invention.

The sixth embodiment of an image conversion apparatus according to the invention is described below with reference to FIG. 7. It is to be noted that FIG. 7 shows a corresponding portion of FIG. 2B of the first embodiment, and that the circuit of FIG. 2A from the first embodiment and the circuit of FIGS. 6A and 6B from the fifth embodiment can be connected to the circuit of FIG. 7 to complete the entire structure of the sixth embodiment. The only difference of the sixth embodiment with respect to the fifth embodiment is that the sixth embodiment has a selector 62 for selecting any one of different compressed image data An, Bn1 and Bn2, which may be corresponding to the HDTV signal An, standard TV signal Bn1, and coarse TV signal Bn2.

As shown in FIG. 7, selector 62 is provided in the output path of the image conversion apparatus for alternatively selecting the signal line 10 (An), the output from the first image coding unit 2 (Bn1), or the output from the second image coding unit 3 (Bn2) according to the control signal input from the key input device 61. Whereas in the first embodiment the outputs of the first and second image coding units 2 and 3 are output directly to the transmission path, the output can be switched by the selector 62 to output compressed image data in response to a user request applied via the key input device 61.

It is therefore possible for the user to obtain compressed image data at the desired resolution even when the capacity of the transmission path to the viewing position is limited.

It is to be noted that the image coders and decoders described hereinabove have been described using a DCT coding method, but it will be obvious that the present invention shall not be so limited and other coding/decoding methods can also be used, including orthogonal transform, vector quantization, sub-band coding, and DPCM.

It shall be further noted that while spatial resolution conversion was used for resolution conversion by way of example in the first, fourth, fifth, and sixth embodiments above, the present invention shall not be so limited and the same effects can be obtained using other conversion methods, including changing the number of frames or temporal resolution conversion. In addition, the above embodiments have been described as discretely applying spatial resolution or image quality conversion for resolution conversion, but the present invention shall not be so limited and spatial, temporal, and/or image quality conversions can be used in various combinations thereof.

The above embodiments have been further described assuming a high resolution compressed image data input, but it is also possible to constitute the present invention to generate compressed image data with enhanced resolution using a low resolution compressed image data input.

The fourth, fifth, and sixth embodiments above were also described in combination with the image conversion apparatus described in the first embodiment, but shall not be so limited and can specifically be comprised with the image conversion apparatus of the second or third embodiments.

The embodiments have also been described comprising two types of image coders each for the temporal resolution, spatial resolution, and quantization level. The spatial resolution conversion is done by the first and second resolution converters 28 and 40 shown in FIGS. 2C and 2D. The quantization level change, so as to change the resolution, is done by the quantize control 4 and quantizers 22 and 34 shown in FIGS. 3B and 3C. The temporal resolution conversion is done by a temporal resolution converter disclosed in MPEG-2. It is also possible, however, to provide plural image coders, e.g., first, second, . . . $k^{th}$ image coders, and to alternatively select the image coder appropriate for the current operation.

By means of an image conversion apparatus according to the present invention, high resolution images can be efficiently coded because coding can be executed using the full transfer rate allotted. Both high and low resolution images can also be decoded using a single high resolution decoding apparatus because the high resolution compressed image input data is output directly and converted to compressed image data of plural low resolutions.

By means of an image conversion apparatus according to the present invention, the compressed image data stored to the storage unit is read as required for conversion to and output at a particular resolution, and image data can thus be output at a wide range of image resolutions. It is therefore also not necessary to provide the storage unit with a massive storage capacity.

By means of an image conversion apparatus according to the present invention, the selector can switch the output to output the desired compressed image data by applying the appropriate command to the key input device in response to a request from the user of the image conversion apparatus. It is therefore possible for the user to obtain compressed image data at a particular resolution even when the capacity of the transmission path to the viewing site is limited.

By means of an image conversion apparatus according to the present invention, the image resolution can be changed in response to a request from the user of the image conversion apparatus, and the user can therefore obtain compressed image data at a particular resolution.

By means of an image conversion apparatus according to the present invention, it is possible to further simplify the hardware required for the image conversion apparatus because the image resolution can be changed by selecting the conversion coefficient.

There is also no image deterioration resulting from any of the above embodiments because high resolution images can be coded using the entire transfer rate allotted. Images of different resolutions can also be decoded using only a single high resolution image decoding unit 1, and the load on the decoding unit can be reduced.

Next, variations and modifications of the second embodiment, particularly the circuit portion enclosed by a double dot dash line shown in FIGS. 3A and 3B, will be described.

It is to be noted that while the modifications are described using, by way of example, only the compression-coded bit stream obtained by the interframe predictive DCT coding method, the image recompression method and image recompression apparatus of the present invention shall not be limited to this method. Other compression schemes to which the present invention can also be applied include other compression coding methods using interframe prediction (including subband and wavelet conversion), and compression coding methods using prediction between picture elements or other data units (including differential pulse code modulation (DPCM)).

The basic concept of the modifications are disclosed in U.S. patent application Ser. No. 08/252,173 filed Jun. 1, 1994 by Boon Choong Seng (European Patent Publication No. 627 858 A3 published Dec. 7, 1994), the entire content of which is expressly incorporated by reference herein.

(Modification 1)

Figure 8:
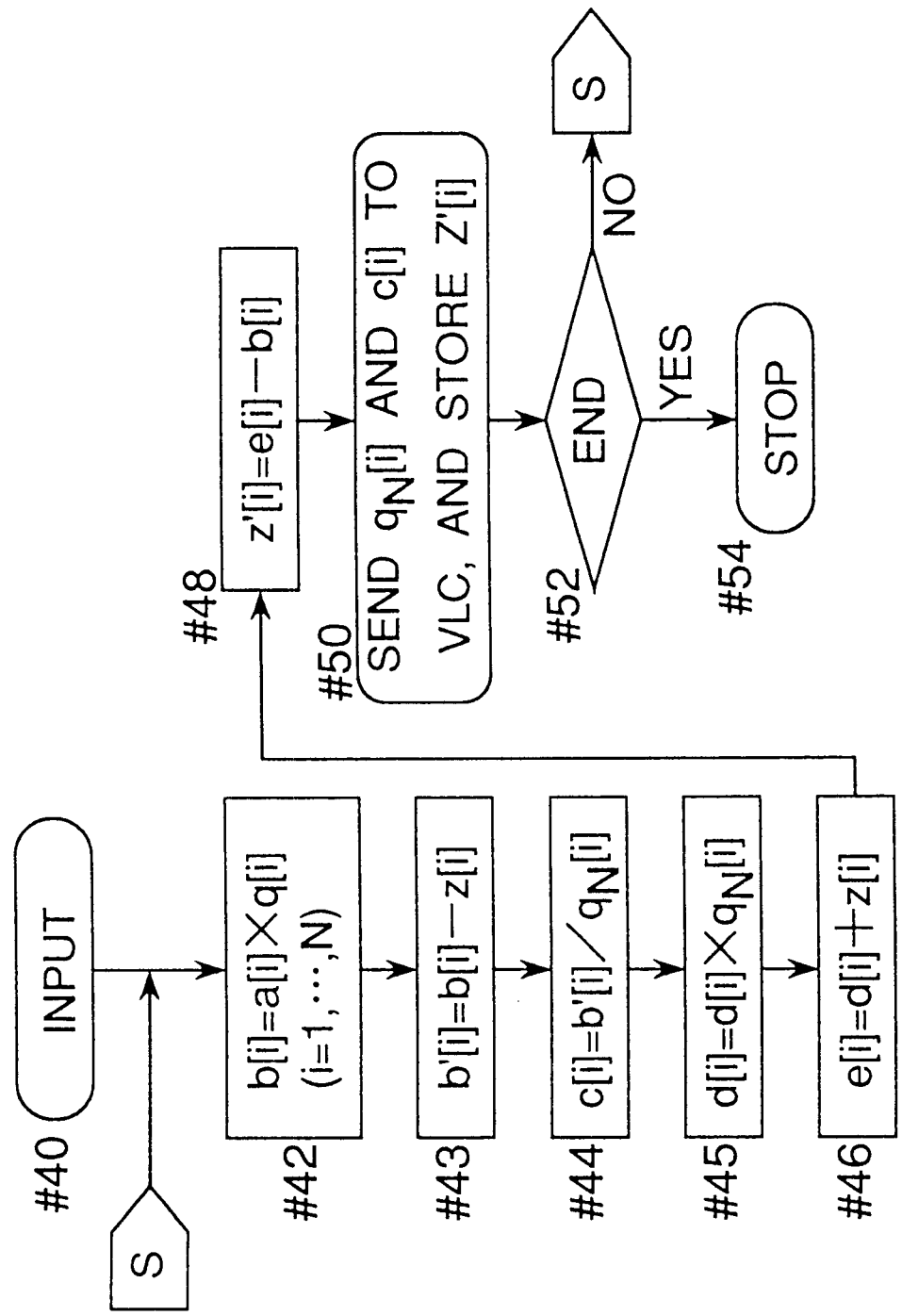
FIG. 8 is a flow chart showing an image recompression method according to a first modification of the embodiment shown in FIGS. 3A and 3B.

The first modification of the invention is described below with reference to FIG. 8, showing a flow chart used to describe an image recompression method according to the first modification of the invention.

This process starts when the compression-coded image data bit stream is input at step #40. The quantized DCT coefficient a[i] and the first quantization step q[i] are then extracted from the bit stream. Note that [i], is a value from 1 . . . N, "N" is the number of DCT coefficients for the target blocks, and the value of N varies according to the target block. The DCT coefficient a[i] is obtained by a DCT of the source image or prediction error, and then quantizing the result at q[i]. Furthermore, while i≠j, the first quantization step q[i] may be equal to other quantization steps such that q[i]=q[j].

The quantization step q[i] is then multiplied by the coefficient a[i] for inverse quantization (step #42). A compensation coefficient z[i] is then subtracted from the inverse quantized coefficient b[i] obtained by inverse quantization (step #43). This compensation coefficient z[i] is the recompression error occurring from recompression of the preceding image data (the compensation coefficient is obtained in step #48 as described below).

The compensated coefficient b'[i] is then quantized in step #44 by a second quantization step $q_N[i]$ to obtain the quantization coefficient c[i]. As with the first quantization step, while i≠j, the second quantization steps $q_N[i]$ may be equal such that $q_N[i]=q_N[j]$. Note also that the second quantization step $q_N[i]$ is normally controlled so that the image bit stream after recompression contains less data than does the bit stream of the original input video. The resulting quantization coefficient c[i] and quantization step $q_N[i]$ are then applied to a variable length coder in step #50.

The method of obtaining this compensation coefficient is described below. This compensation coefficient is the quantization error resulting from quantization at the second quantization step $q_N[i]$. To obtain this coefficient, inverse quantization is first applied at step #45, i.e., coefficient c[i] is multiplied by $q_N[i]$ to generate inverse quantized coefficient d[i]. Because the compensation coefficient z[i] is subtracted from the inverse quantized coefficient b[i] in step

43, the inverse quantized coefficient d[i] (from step #45) is compensated by adding z[i] to d[i] in step #46, resulting in compensated coefficient e[i]. Note that the coefficient e[i] is restored by re-quantizing b[i]. The quantization error caused by re-quantization at $q_N[i]$ can therefore be determined by obtaining the difference between e[i] and b[i]. This quantization error is the compensation coefficient z'[i] applied to the next picture. In other words, compensation coefficient z'[i] is obtained in the present frame, and compensation coefficient z[i] is obtained in the previous frame. It is to be noted that the compensation coefficient z'[i] can also be obtained by subtracting the compensated coefficient b'[i] from the inverse quantized coefficient d[i].

The compensation coefficients z'[i] are then stored temporarily (step #50) for use as the compensation signal when recompressing the next picture.

The above sequence is repeated for each block in the current picture, and the compensation coefficients z'[i] are stored for each block. Before recompressing the next picture, the compensation coefficients z'[i] are read from memory and used as the compensation coefficients z[i] in the above process.

Note that steps #43 and #46 are not executed for intraframe coded blocks because these frames are entirely coded without referencing the previous image. In addition, the above process is executed in the DCT domain, but the DCT coefficients may be inversely converted and the process executed in the spatial domain.

It should also be noted that the inverse quantization applied in step #42 may be omitted. In this case, b[i]=a[i] in step #42, and the second quantization step $q_N[i]$ is multiplied by q[i]. Then, in step #50, q[i] is output in place of $q_N[i]$.
(Modification 2)

Figure 9:
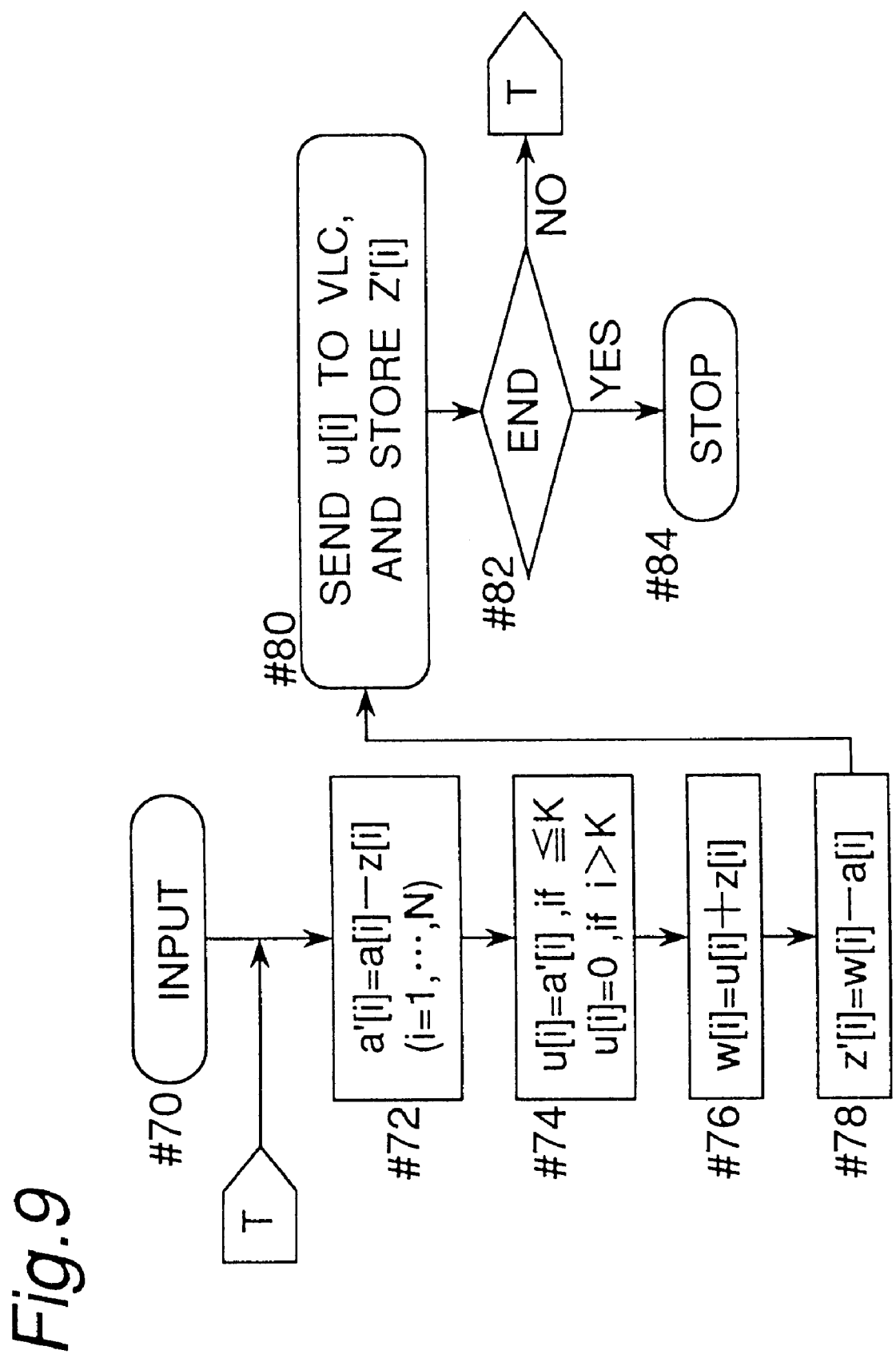
FIG. 9 is a flow chart showing an image recompression method according to a second modification of the same.

The second modification of the invention is described below with reference to FIG. 9, showing a flow chart used to describe an image recompression method according to the second modification of the invention.

This process starts when the compression-coded image data bit stream is input at step #70. The quantized DCT coefficient a[i] is then extracted from the bit stream. Note that as above "i" is a value from 1 . . . N, "N" is the number of DCT coefficients for the target blocks, and the value of N varies according to the target block. The DCT coefficient a[i] is obtained by a DCT of the source image or prediction error, and then quantizing the result.

A compensation coefficient z[i] is then subtracted from the DCT coefficient a[i] (step #72). This compensation coefficient z[i] is the recompression error occurring from recompression of the preceding image data (the compensation coefficient is obtained in step #78 as described below).

"K" compensated coefficients a'[i], where K≦N, are then selected and held (coefficients u[i]), and the other coefficients are discarded (step #74). By thus rounding-down the coefficients, the picture can be compressed with even greater efficiency. Furthermore, the value of K varies according to the image block, and is controlled such that the image bit stream after recompression contains less data than the bit stream of the original picture input. The resulting coefficient u[i] is then output in step #80.

The method of obtaining this compensation coefficient is described below. This compensation coefficient is the error resulting from discarding a number of compensated coefficients a'[i]. To obtain this error, the selected coefficients u[i] are compensated by adding the compensation coefficient z[i] thereto, obtaining compensated coefficients w[i]. Note that the compensated coefficients w[i] correspond to the coefficients held after coefficient rounding-down in step #74. As a result, the error introduced by the rounding-down step can be determined by obtaining the difference between w[i] and a[i], which is performed in step #78 and results in the compensation coefficients z'[i]. It is to be noted that the compensation coefficients z'[i] can also be obtained by subtracting the compensated coefficients a'[i] (coefficients a[i] compensated by z[i]) from the selected coefficients u[i].

The compensation coefficients z'[i] are then stored temporarily (step #80) for use as the compensation signal when recompressing the next picture.

The above sequence is repeated for each block in the current picture, and the compensation coefficients z'[i] are stored for each block. Before recompressing the next picture, the compensation coefficients z'[i] are read from memory and used as the compensation coefficients z[i] in the above process.

Note that steps #72 and #76 are not executed for intraframe coded blocks because these frames are entirely coded without referencing the previous image.
(Modification 3)

Figure 10:
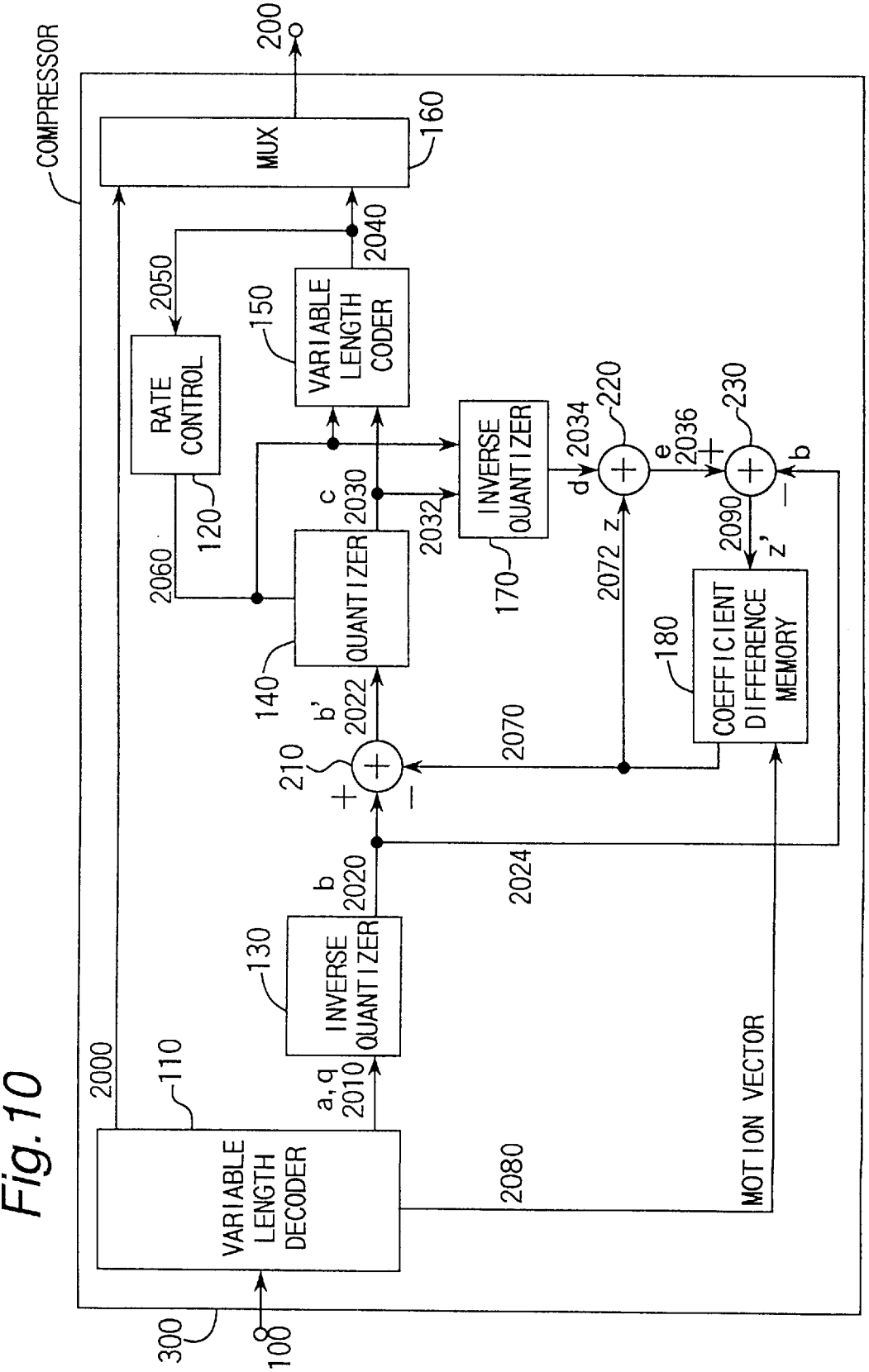
FIG. 10 shows a block diagram of an image recompression apparatus according to a third modification of the same, and particularly for carrying out the flow chart of FIG. 8.

The third modification of the invention is described below with reference to FIG. 10, showing a block diagram of an image recompression apparatus 300 which carries out the steps (shown in FIG. 8) described in the first modification. As shown in FIG. 10, this image recompression apparatus comprises a variable length decoder 110, a rate controller 120, a first inverse quantizer 130, a first adder 210, a quantizer 140, a variable length coder 150, a multiplexer 160, a second inverse quantizer 170, a second adder 220, a third adder 230, and a coefficient difference memory 180.

The bit stream of coded image data is input from the input terminal 100 to the variable length decoder 110, which analyzes the incoming bit stream to select and decode to numeric values the quantization step q[i] and quantized DCT coefficients a[i]. Note that as above "i" is a value from 1 . . . N, "N" is the number of DCT coefficients for the target blocks, and the value of N varies according to the target block.

The variable length decoder 110 outputs the decoded values to the first inverse quantizer 130 via line 2010. The rest of the data in the incoming bit stream (i.e., the data other than q[i] and a[i]) is throughput from the variable length decoder 110 via line 2000 to the multiplexer 160.

The first inverse quantizer 130 inverse quantizes a[i] at quantization step q[i], resulting in the inverse quantized coefficient b[i] output to the first adder 210 via line 2020. The first adder 210 subtracts the compensation coefficient z[i], which is generated from the past image data and is stored in the coefficient difference memory 180, from b[i], resulting in compensated inverse quantized coefficients b'[i]. These coefficient b'[i] are then input to the quantizer 140 through line 2022 for quantization by a new quantization parameter $q_N[i]$ to generate the quantized coefficient c[i].

Both the quantized coefficient c[i] and the quantization parameter $q_N[i]$ are input to the variable length coder 150 via line 2030, and converted thereby to variable length code, which is output to the multiplexer 160.

The multiplexer 160 multiplexes the variable-length-coded quantized coefficient c[i] and the quantization parameter $q_N[i]$ input from the variable length coder 150 via line 2040 with the other data in the incoming bit stream input from the variable length decoder 110 via line 2000, and outputs the multiplexed bit stream. The resulting multiplexed bit stream is thus a recompressed version of the incoming bit stream.

Note that the value of the quantization step $q_N[i]$ is normally determined by counting the bits in the output of the variable length coder 150, and the rate controller 120 setting the quantization step $q_N[i]$ accordingly to achieve a particular bit rate.

Note, further, that the first inverse quantizer 130 can be omitted. In this case, signals b[i] and a[i] on line 2020 are equal, and the result of multiplying q[i] by $q_N[i]$ is output to the multiplexer 160 over line 2040 in place of $q_N[i]$.

The quantization step $q_N[i]$ and coefficient c[i] are also input to the second inverse quantizer 170 via line 2032 for inverse quantization of c[i] at $q_N[i]$, thus generating inverse quantized coefficient d[i]. The second adder 220 then adds the compensation coefficient z[i] generated according to the past image data to d[i], and outputs the sum to the third adder 230.

The third adder 230 obtains the coefficient difference z'[i] from the sum input from the second adder 220 and b[i] input from line 2024. The coefficient differences z'[i] are then stored in the coefficient difference memory 180. These coefficient differences are then used as the compensation coefficients for recompressing the next picture.

Figure 15:
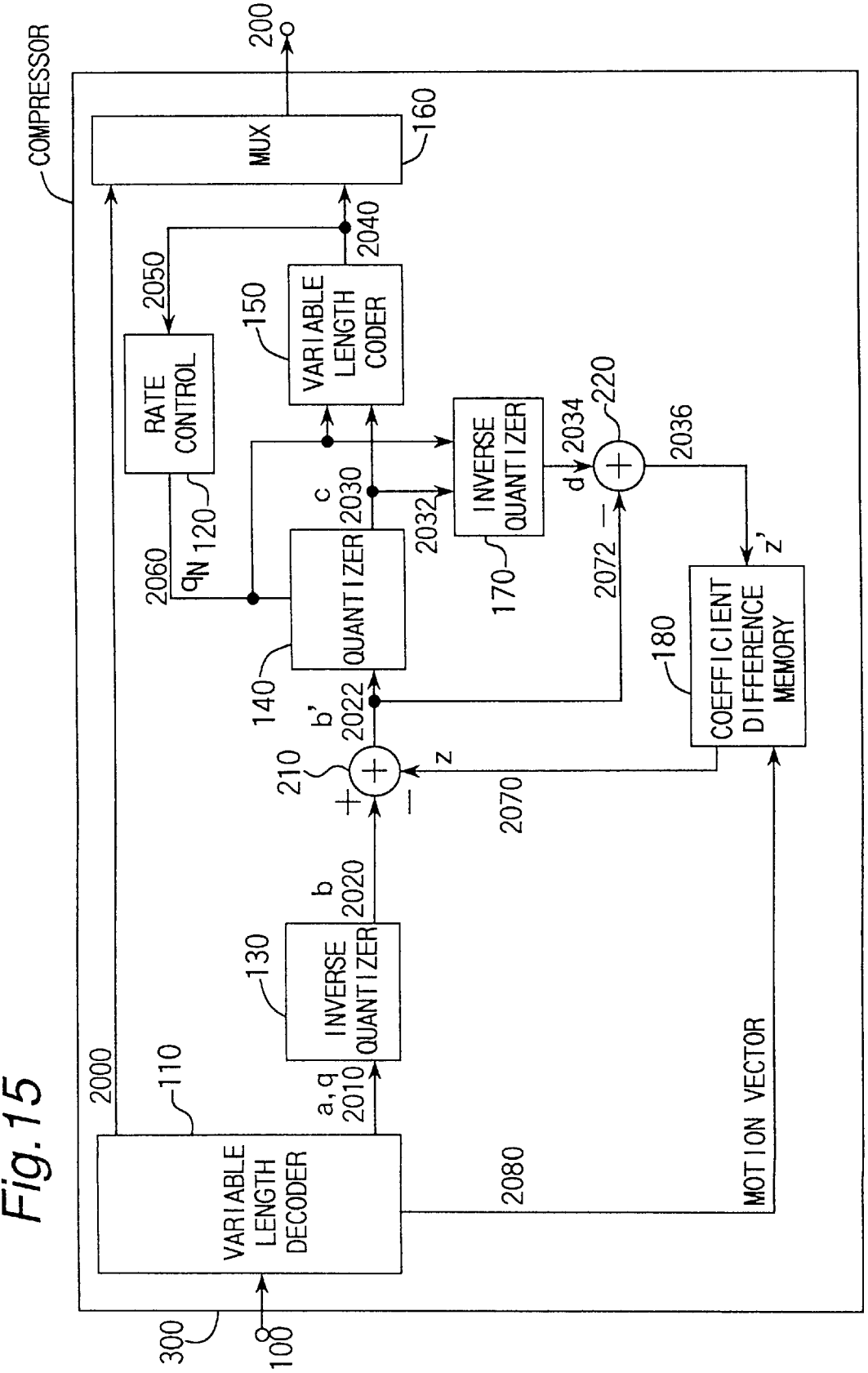
FIG. 15 is a view similar to FIG. 10, but showing a variation thereof.

As shown in FIG. 15, it is to be noted that the coefficient differences z'[i] can also be obtained by subtracting the output b'[i] from the first adder 210 from the inverse quantized coefficients d[i] output from the second inverse quantizer 170. This configuration also makes it possible to eliminate one adder.

Figure 11:
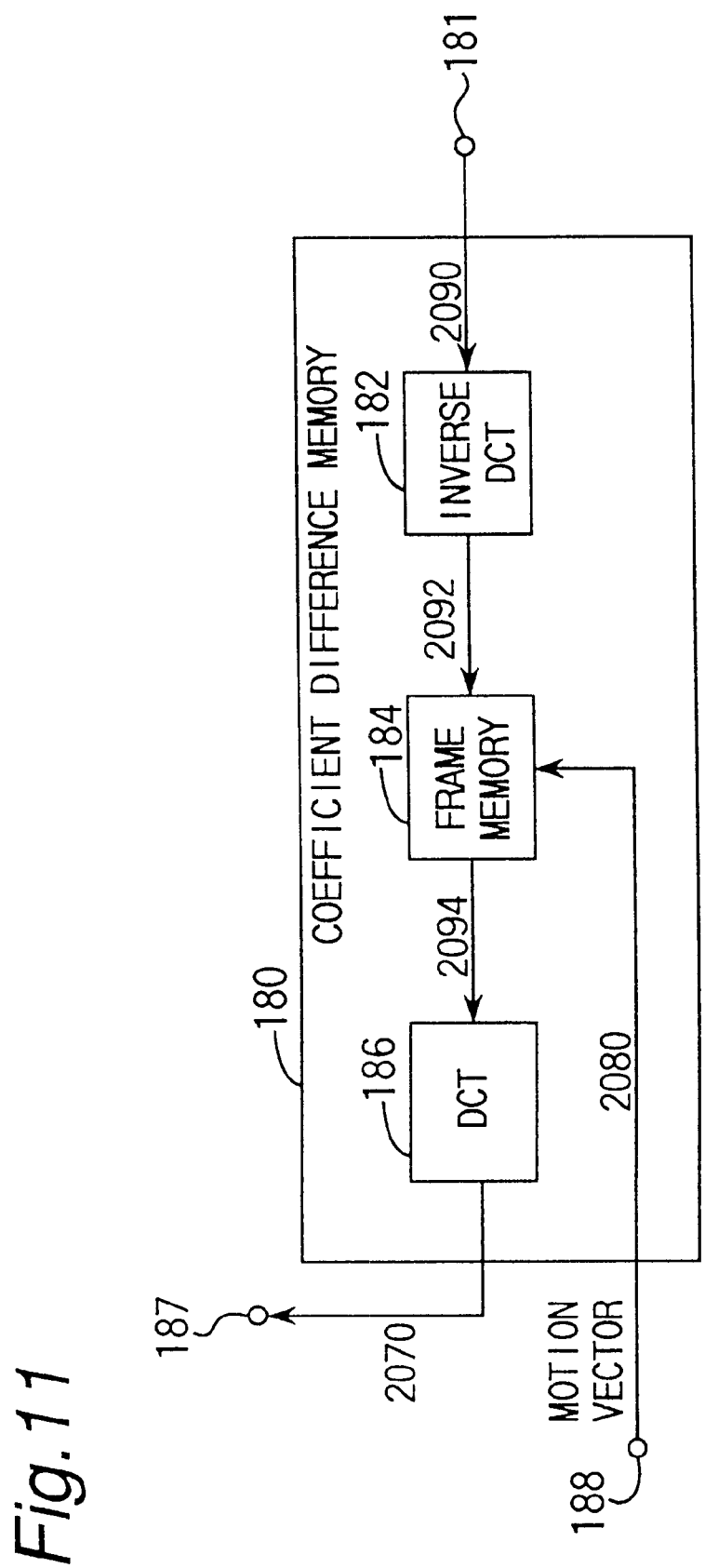
FIG. 11 shows a block diagram of the difference coefficient memory shown in FIG. 10.

The preferred modification of the coefficient difference memory 180 is described next with reference to FIG. 11, showing a block diagram of the coefficient difference memory 180. As shown in FIG. 11, this coefficient difference memory 180 comprises an inverse orthogonal transform processor, such as an inverse DCT, 182, a frame memory 184, and an orthogonal transform processor, such as a DCT, 186. The coefficient differences z'[i] input from the input terminal 181 are DCT coefficients. These coefficients are inversely converted by the inverse orthogonal transform processor 182 to restore the spatial domain difference signals. The results are stored to the frame memory 184, and are used when recompressing the next picture.

The operation whereby the next picture is recompressed is considered next. Motion compensation is required to obtain a spatial domain difference signal from the frame memory 184 because the prediction signal is obtained by motion compensation. This motion information is input from the variable length decoder 110 via line 2080.

The difference signal for the target block is then fetched from the frame memory 184 based on the motion information, and output to the orthogonal transform processor 186 via line 2094. The spatial domain difference signal is then converted to the conversion domain to generate the coefficient difference. This coefficient difference is output via line 2070 to the first adder 210, and used as the compensation coefficient. When motion compensation is applied with a precision of one-half picture element or greater, the difference signals stored to the frame memory 184 are interpolated and up-sampled before motion compensation.

Note that it is also possible to directly store the DCT domain coefficients z'[i] to the frame memory 184, and apply motion compensation in the DCT domain to generate the compensation coefficients. In this case both the inverse orthogonal transform processor 182 and orthogonal transform processor 186 can be eliminated.

While this modification has been described with reference to interframe predictive coding, it is also possible to use other DPCM techniques referencing pixels or other data units. In this case the signals are not processed in the conversion domain, and the inverse orthogonal transform processor 182 and orthogonal transform processor 186 in FIG. 11 can be eliminated.

(Modification 4)

Figure 12:
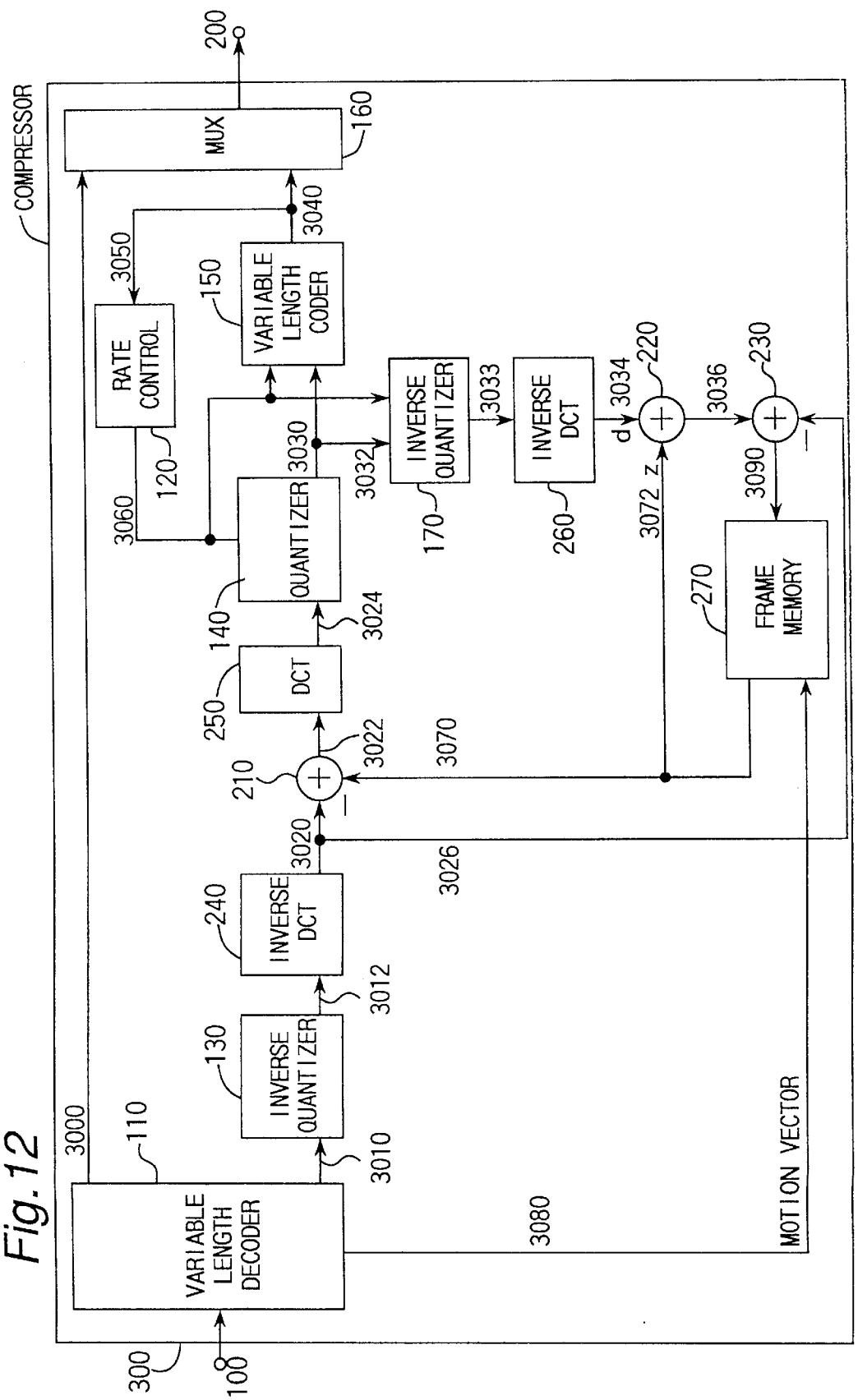
FIG. 12 shows a block diagram of an image recompression apparatus according to the fourth modification of the same.

The fourth modification of the invention is described below with reference to FIG. 12, showing a block diagram of an image recompression apparatus 300 according to the fourth modification of the invention. As shown in FIG. 12, this image recompression apparatus comprises a variable length decoder 110, a rate controller 120, a first inverse quantizer 130, a first inverse orthogonal transform processor 240, a first adder 210, an orthogonal transform processor 250, a quantizer 140, a variable length coder 150, a multiplexer 160, a second inverse quantizer 170, a second inverse orthogonal transform processor 260, a second adder 220, a third adder 230, and a frame memory 270 for storing difference signal.

The bit stream of coded image data is input from the input terminal 100 to the variable length decoder 110, which analyzes the incoming bit stream to select and decode to numeric values the quantization step q[i] and quantized DCT coefficients a[i]. Note that as above "i" is a value from 1 . . . N, "N" is the number of DCT coefficients for the target blocks, and the value of N varies according to the target block.

The variable length decoder 110 outputs the decoded values to the first inverse quantizer 130 via line 3010. The rest of the data in the incoming bit stream (i.e., the data other than q[i] and a[i]) is throughput from the variable length decoder 110 via line 3000 to the multiplexer 160.

The first inverse quantizer 130 inverse quantizes a[i] at quantization step q[i], resulting in the inverse quantized coefficient b[i], which is output to the first inverse orthogonal transform processor 240 via line 3012. The first inverse orthogonal transform processor 240 converts the DCT domain coefficients b[i] to the spatial domain, obtaining a first spatial signal s[i]. This spatial signal s[i] is output via line 3020 to the first adder 210.

The first adder 210 subtracts the compensation coefficient z[i], which is generated from the past image data and is stored in the difference signal memory 270, from spatial signal s[i], resulting in compensated spatial signal s'[i]. The spatial signals s'[i] are input via line 3022 to the orthogonal transform processor 250, and converted thereby to DCT domain coefficients b'[i]. The DCT coefficients b'[i] are then input to the quantizer 140 through line 3024 for quantization by a new quantization parameter $q_N[i]$ to generate the quantized coefficient c[i].

Both the quantized coefficient c[i] and the quantization parameter $q_N[i]$ are input to the variable length coder 150 via line 3030, and converted thereby to variable length code, which is output to the multiplexer 160.

The multiplexer 160 multiplexes the variable-length-coded quantized coefficient c[i] and the quantization parameter $q_N[i]$ input from the variable length coder 150 via line 3040 with the other data in the incoming bit stream input from the variable length decoder 110 via line 3000, and outputs the multiplexed bit stream. The resulting multiplexed bit stream is thus a recompressed version of the incoming bit stream.

Note that the value of the quantization step $q_N[i]$ is normally determined by counting the bits in the output of the variable length coder 150, and the rate controller 120 setting the quantization step $q_N[i]$ accordingly to achieve a particular bit rate.

The quantization step $q_N[i]$ and coefficient c[i] are also input to the second inverse quantizer 170 via line 3032 for inverse quantization of c[i] at $q_N[i]$, thus generating inverse quantized coefficient d[i]. Coefficient d[i] is then output to the second inverse orthogonal transform processor 260. The second inverse orthogonal transform processor 260 converts the DCT domain coefficients d[i] to spatial domain signals s"[i]. The second adder 220 then adds the compensation coefficient z[i] generated according to the past image data to s"[i], and outputs the sum to the third adder 230.

The third adder 230 obtains the difference signal z'[i] from the sum input from the second adder 220 and the spatial signal s[i] input from the first inverse orthogonal transform processor 240 via line 3026. The difference signals z'[i] are then stored in the difference signal memory 270. These difference signals are then used as the compensation signal for recompressing the next picture.

Figure 16:
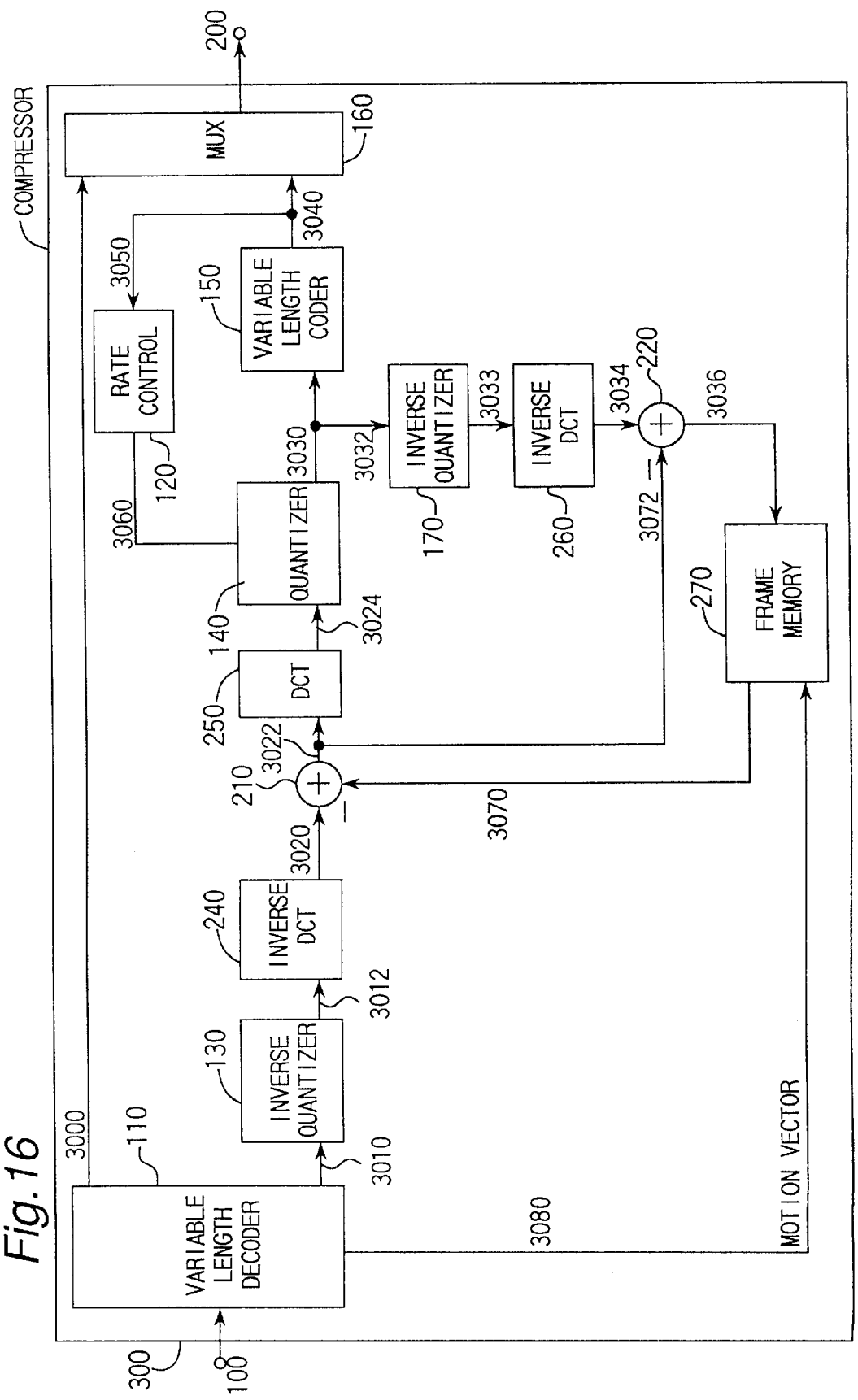
FIG. 16 is a view similar to FIG. 12, but showing a variation thereof.

As show in FIG. 16, it is to be noted that the difference signals z'[i] can also be obtained by subtracting the output s'[i] from the first adder 210 from the output s"[i] of the second inverse orthogonal transform processor 260. This case also makes it possible to eliminate one adder.

When the next picture is recompressed, the difference signal for the target block is fetched from the difference signal memory 270 based on the motion information input from the variable length decoder 110 via line 3080, output to the first adder 210 via line 3070, and used as the compensation signal. When motion compensation is applied with a precision of one-half picture element or greater, the difference signals stored to the difference signal memory 270 are interpolated and up-sampled before motion compensation.

(Modification 5)

Figure 13:
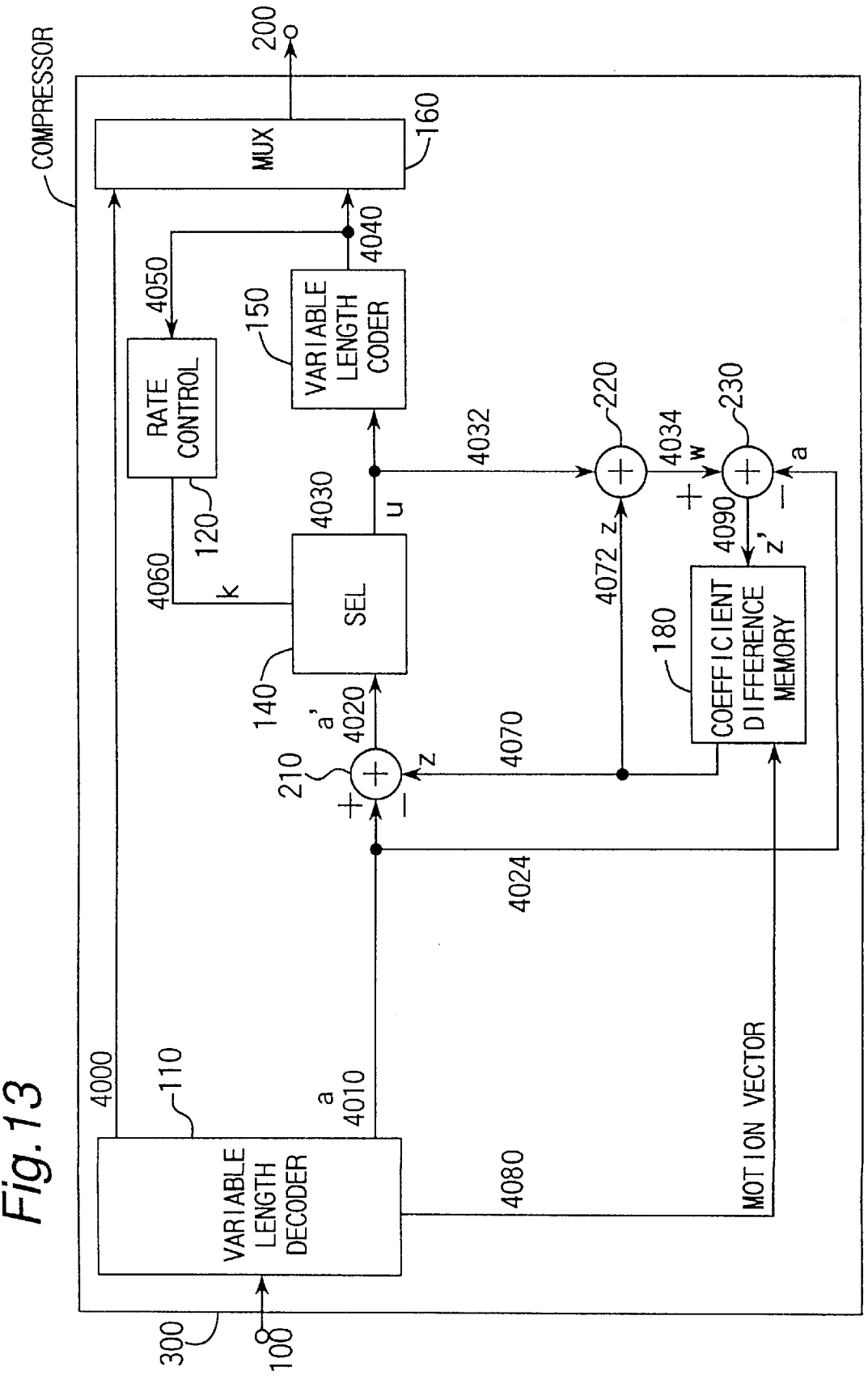
FIG. 13 shows a block diagram of an image recompression apparatus according to the fifth modification of the same.

The fifth modification of the invention is described below with reference to FIG. 13, showing a block diagram of an image recompression apparatus 300 according to the fifth modification of the invention. As shown in FIG. 13, this image recompression apparatus comprises a variable length decoder 110, a rate controller 120, a first adder 210, a coefficient selector 280, a variable length coder 150, a multiplexer 160, a second adder 220, a third adder 230, and a coefficient difference memory 180.

The bit stream of coded image data is input from the input terminal 100 to the variable length decoder 110, which analyzes the incoming bit stream to select and decode to numeric values the quantized DCT coefficients a[i]. Note that as above "i" is a value from 1 ... N, "N" is the number of DCT coefficients for the target blocks, and the value of N varies according to the target block.

The variable length decoder 110 outputs the decoded values to the first adder 210 via line 4010. The rest of the data in the incoming bit stream (i.e., the data other than a[i]) is throughput from the variable length decoder 110 via line 4000 to the multiplexer 160.

The first adder 210 subtracts the compensation coefficient z[i], which is generated from the past image data and is stored in the coefficient difference memory 180, from a[i], resulting in compensated coefficient a'[i]. A data block containing N coefficients a'[i] (where i=1 ... N) is input to the coefficient selector 280 through line 4020.

The coefficient selector 280 selects and holds "K" compensated coefficients a'[i], where K≦N, from the N coefficients a'[i] (these becoming the selected coefficients u[i]), and discards the other coefficients. By thus rounding-down the coefficients, the picture can be compressed with even greater efficiency.

The selected coefficients u[i] are input to the variable length coder 150 via line 4030, converted to variable length code, and output to the multiplexer 160.

The multiplexer 160 multiplexes the variable-length-coded selected coefficients u[i] input from line 4040 with the other data in the incoming bit stream input from the variable length decoder 110 via line 4000, and outputs the multiplexed bit stream.

Note that the value of K varies according to the block, and is normally determined by counting the bits in the output of the variable length coder 150, and the rate controller 120 setting K accordingly to achieve a particular bit rate.

Coefficients u[i] are also input to the second adder 220 via line 4032. The second adder 220 then adds the compensation coefficient z[i] generated according to the past image data to u[i], and outputs the compensation coefficient w[i] to the third adder 230.

The third adder 230 obtains the coefficient difference z'[i] from the output w[i] of the second adder 220 and a[i] input from the variable length decoder 110 via line 4012. The coefficient differences z'[i] are then stored in the coefficient difference memory 180. These coefficient differences are then used as the compensation coefficients for recompressing the next picture.

Figure 17:
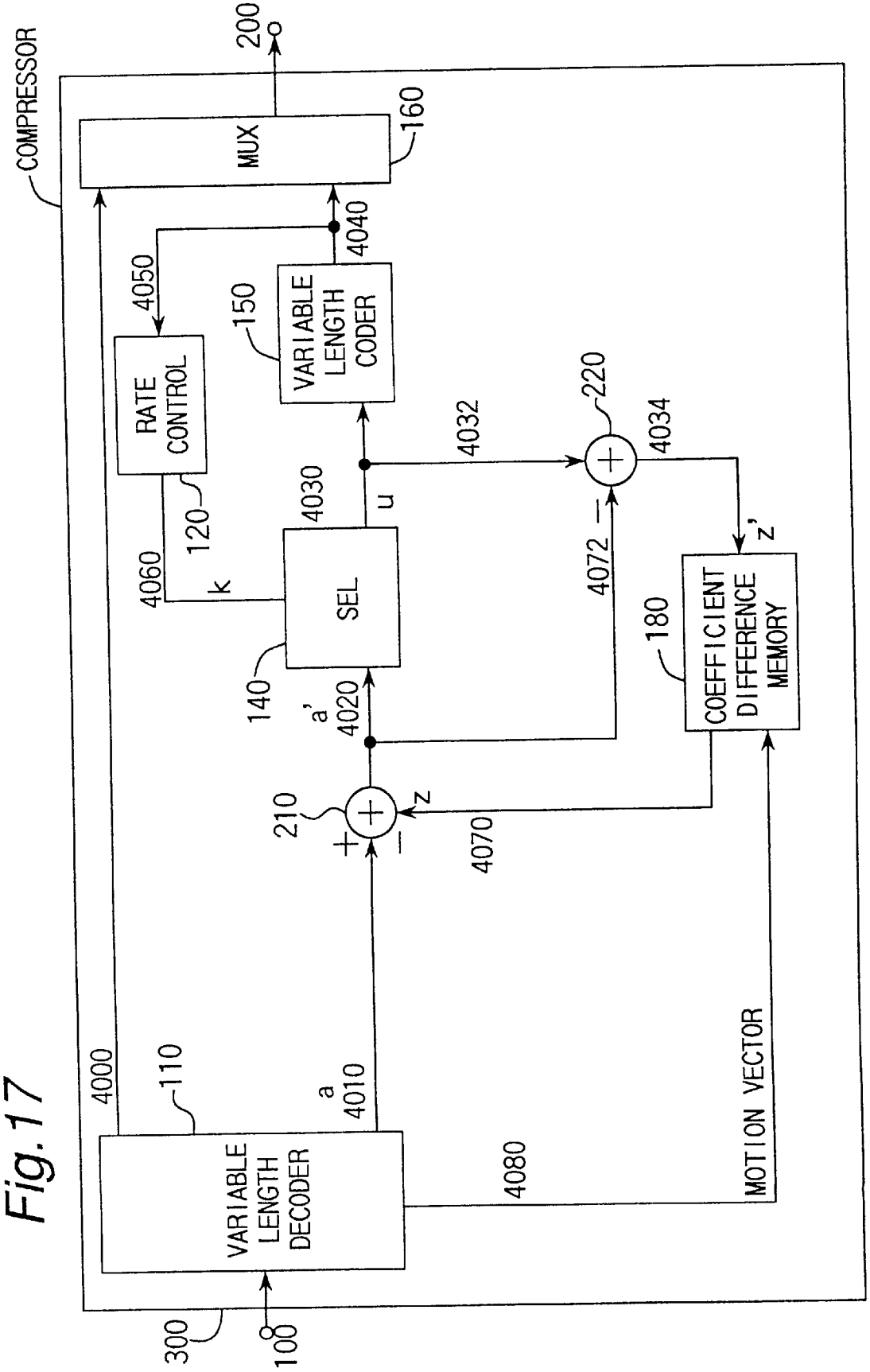
FIG. 17 is a view similar to FIG. 13, but showing a variation thereof.

As shown in FIG. 17, it is noted that the coefficient differences z'[i] can also be generated by subtracting the output a'[i] of the first adder 210 from the output u[i] of the coefficient selector 280. In this case, one adder can be eliminated.

The preferred modification of the coefficient difference memory 180 is as shown in FIG. 11 and described above with respect to the third modification of the invention.

(Modification 6)

Figure 14:
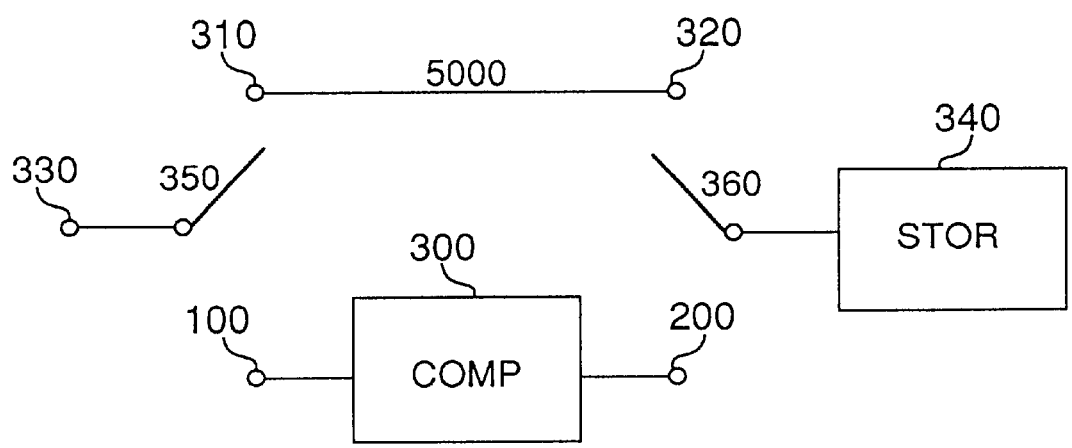
FIG. 14 shows a diagram of an image recording apparatus according to the sixth modification of the same.

The sixth modification of the invention is described below with reference to FIG. 14, showing a block diagram of an image recording apparatus according to the sixth modification of the invention. As shown in FIG. 14, this image recording apparatus comprises an external input terminal 330, selector switches 350 and 360, an image recompression apparatus 300, and a recording apparatus 340. Note that the image recompression apparatus 300 is an image recompression apparatus according to the present invention as shown in FIGS. 10, 12, or 13.

The bit stream is input from the external input terminal 330. When recording in the normal recording mode, the first selector switch 350 is closed to terminal 310, and the other selector switch 360 is closed to terminal 320. In this case the bit stream is not processed by the image recompression apparatus, is sent directly to the recording apparatus 340, and is recorded thereby to the recording medium (magnetic tape, optical disk, or other).

To record in an extended-play mode, however, the first selector switch 350 is closed to terminal 100, and the other selector switch 360 is closed to terminal 200. When the switches are thus positioned, the switching circuit effectively completes the apparatus described in the third through fifth modifications above, and the bit stream recompressed by the image recompression apparatus 300 is recorded by the recording apparatus 340. By thus switching the path of the incoming bit stream, the bit stream can be recorded directly in a normal recording mode, or can be recompressed for recording in an extended-play recording mode.

As will be known from the above descriptions of the preferred modifications, an input bit stream can be recompressed to a bit stream of a different bit rate by means of the image recompression apparatus and image recompression method of the present invention without completely decoding and reproducing the bit stream. As a result, there is virtually no delay in recompression throughput. It is also possible to prevent the propagation of errors caused by recompression, and thus to reduce image quality deterioration, because the prediction error of the current picture is compensated based on an error signal generated by recompressing the past picture before recompressing the current picture.

Therefore, the above modifications provides the apparatus and method for recompressing a compression-coded image bit stream to a lower bit rate (with higher compression efficiency) without propagating errors by recompressing the current image after compensating the prediction error of the current image using the error signal resulting from recompressing the image before.

The above modifications can be summarized as follows.

According to one modification, a compressed image data quantized by a first quantization parameter is inverse quantized using said first quantization parameter to generate the first inverse quantized image data. A compensation signal generated from the past image data is then subtracted from the first inverse quantized image data, quantized using a second quantization parameter, and inverse quantized using said second quantization parameter to generate the second inverse quantized image data, which is output. A difference signal is then generated from the second inverse quantized image data and first inverse quantized image data for use as the compensation signal of the next image data. Preferably, a compensation signal generated from the past image data is added to the second inverse quantized image data, and then the difference signal is generated from the first inverse quantized image data and the compensated second inverse quantized image data.

According to another modification, a compensation coefficient generated according to the past image data is subtracted from a first conversion coefficient block contained in the compressed orthogonal transform image data, thereby generating a second conversion coefficient block. A predetermined number of coefficients is then extracted from the second conversion coefficient block to generate and output a third conversion coefficient block. A difference coefficient block is then generated from the third conversion coefficient block and the first conversion coefficient block for use as the compensation coefficient of the next image data. Preferably, a compensation coefficient generated from the past image data is added to the third conversion coefficient block, and the difference coefficient block is then generated from the first conversion coefficient block and the compensated third conversion coefficient block.

The propagation of errors caused by requantizing is prevented by means of an image recompression apparatus as described below.

The image recompression apparatus comprises a variable length decoder, a first inverse quantizer, a first adder, a quantizer, a variable length coder, a multiplexer, a second inverse quantizer, a second adder, a third adder, and a difference coefficient memory.

The variable length decoder decodes a first quantization parameter and a first quantized coefficient from the coded image input data, transfers said decoded data to the first inverse quantizer, and transfers the data other than said first quantization parameter and first quantized coefficient to the multiplexer. The first inverse quantizer inverse quantizes the first quantized coefficient using the first quantization parameter to generate a first inverse quantized coefficient. The first adder subtracts a compensation coefficient generated according to the past image data and stored in the difference coefficient memory from the first inverse quantized coefficient, and inputs the difference to the quantizer for quantization using the second quantization parameter to generate a second quantized coefficient. The variable length coder converts the second quantization parameter and the second quantized coefficient input thereto to variable length code, and outputs said variable length code to the multiplexer. The multiplexer multiplexes and outputs the input variable length code with the other data input from the variable length decoder. The second inverse quantizer inverse quantizes the second quantized coefficient using the second quantization parameter to generate a second inverse quantized coefficient. The second adder adds the compensation coefficient generated according to the past image data to the second inverse quantized coefficient; the third adder generates a difference coefficient from the first inverse quantized coefficient and the compensated second inverse quantized coefficient, and stores said difference coefficient to a difference coefficient memory. This difference coefficient is used as the compensation coefficient of the next image data.

The propagation of errors caused by requantizing can also be prevented by means of an image recompression apparatus as described below.

The image recompression apparatus comprises a variable length decoder, a first inverse quantizer, a first inverse orthogonal transform processor, a first adder, an orthogonal transform processor, a quantizer, a variable length coder, a multiplexer, a second inverse quantizer, a second inverse orthogonal transform processor, a second adder, a third adder, and a difference signal memory.

The variable length decoder decodes a first quantization parameter and a first quantized coefficient from the coded image input data, transfers said decoded data to the first inverse quantizer, and transfers the data other than said first quantization parameter and first quantized coefficient to the multiplexer. The first inverse quantizer inverse quantizes the first quantized coefficient using the first quantization parameter to generate a first inverse quantized coefficient. The first inverse orthogonal transform processor then converts the first inverse quantized coefficient to a first spatial signal. The first adder subtracts a compensation signal generated according to the past image data and stored in the difference coefficient memory from the first spatial signal. The orthogonal transform processor applies an orthogonal transform to the resulting difference signal, and inputs the resulting coefficient to the quantizer for quantization using the second quantization parameter to generate a second quantized coefficient. The variable length coder converts the second quantization parameter and the second quantized coefficient input thereto to variable length code, and outputs said variable length code to the multiplexer, which multiplexes and outputs the input variable length code with the other data. The second inverse quantizer inverse quantizes the second quantized coefficient using the second quantization parameter to generate a second inverse quantized coefficient. The second inverse orthogonal transform processor then converts the second inverse quantized coefficient to a second spatial signal. The second adder adds the compensation signal generated according to the past image data to the second spatial signal; and the third adder generates a difference signal from the first spatial signal and the compensated second spatial signal, and stores said difference signal to the difference signal memory. The resulting difference signal is used as the compensation signal of the next image data.

The propagation of errors caused by eliminating conversion coefficients can also be prevented by means of an image recompression apparatus according to the present invention as described below.

This image recompression apparatus comprises a variable length decoder, a first adder, a coefficient selector, a variable length coder, a multiplexer, a second adder, a third adder, and a difference coefficient memory.

The variable length decoder decodes a first conversion coefficient block from the coded image input data, transfers said first conversion coefficient block to the first adder, and transfers the data other than said first conversion coefficient block to the multiplexer. The first adder subtracts a compensation coefficient generated according to the past image data and stored in the difference coefficient memory from the first conversion coefficient block to generate a second conversion coefficient block. The coefficient selector extracts a particular number of coefficients from the second conversion coefficient block, and forms a third conversion coefficient block. The variable length coder converts the third conversion coefficient block input thereto to variable length code, and outputs said variable length code to the second adder and to the multiplexer. The multiplexer multiplexes the input variable length code with other data, and outputs the multiplexed bit stream. The second adder adds the compensation coefficient generated according to the past image data to the third conversion coefficient block; the third adder then generates a difference coefficient from the first conversion coefficient block and the compensated third conversion coefficient block, and stores said difference coefficient to the difference coefficient memory. The resulting difference coefficient is used as the compensation coefficient of the next image data.

It is therefore possible by means of the image recompression method and the image recompression apparatus of the present invention to recompress an input bit stream to a bit stream of a different bit rate without completely decoding the input bit stream and reproducing the coded images. As a result, there is substantially no additional delay imposed by the recompression operation. In addition, the propagation of errors caused by recompression can be prevented, and further image quality deterioration can be reduced, because recompression is applied to the current image after compensating the prediction error of the current image by the error signal generated by recompressing the previous image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image recompression method comprising:
   inverse quantizing a compressed image data, which has been previously quantized by a first quantization parameter, based on the first quantization parameter to generate a first inverse quantized coefficient;
   subtracting a compensation signal based on a previous image data from the first inverse quantized coefficient to produce a compensated inverse quantized coefficient,
   requantizing the compensated inverse quantized coefficient using a second quantization parameter to generate a requantized coefficient;
   reinverse quantizing the requantized coefficient using the second quantization parameter to generate a second inverse quantized coefficient; and
   adding to the second inverse quantized coefficient the compensation signal and further subtracting the first inverse quantized coefficient to generate a compensation signal of the next image data.

2. An image recompression method comprising:
   inverse quantizing a compressed image data, which has been previously quantized by a first quantization parameter, based on the first quantization parameter to generate a first inverse quantized coefficient;
   subtracting a compensation signal based on a previous image data from the first inverse quantized coefficient to produce a compensated inverse quantized coefficient,
   requantizing the compensated inverse quantized coefficient using a second quantization parameter to generate a requantized coefficient;
   reinverse quantizing the requantized coefficient using the second quantization parameter to generate a second inverse quantized coefficient; and
   subtracting the difference data from the second inverse quantized coefficient to generate a compensation signal of the next image data.

3. An image recompression method comprising:
   subtracting a compensation coefficient generated according to a previous image data from a first conversion coefficient block contained in a compressed orthogonal transform image data to generate a second conversion coefficient block;
   extracting a predetermined number of coefficients from the second conversion coefficient block to generate a third conversion coefficient block; and
   generating a difference coefficient block using the third conversion coefficient block and the first conversion coefficient block, wherein the difference coefficient is a compensation coefficient of the next image data.

4. An image recompression method as claimed in claim 3, further comprising: adding a compensation coefficient generated from the past image data to the third conversion coefficient block, before said generating of a difference coefficient block.

5. An image recompression apparatus comprising:
   a variable length decoder operable to decode from a coded image input data, a first quantization parameter, a compressed image data that has been previously quantized by the first quantization parameter, and other information data;
   a first inverse quantizer operable to inverse quantize the compressed image data based on the first quantization parameter to generate a first inverse quantized coefficient,
   a first subtractor operable to subtract a compensation signal based on a previous image data from the first inverse quantized coefficient to produce a compensated inverse quantized coefficient,
   a quantizer operable to requantize the compensated inverse quantized coefficient using a second quantization parameter to generate a requantized coefficient;
   a second inverse quantizer operable to reinverse quantize the requantized coefficient using the second quantization parameter to generate a second inverse quantized coefficient;
   an adder operable to add the compensation signal to the second inverse quantized coefficient to generate a sum data;
   a second subtractor operable to subtract the second inverse quantized coefficient from the sum data to generate a compensation signal of the next image data;
   a memory operable to store the compensation signal;

a variable length coder operable to convert the second quantization parameter and the requantized coefficient to variable length code;

a multiplexer operable to multiplex the variable length code and the other information data to generate a compressed coded image input data.

6. An image recompression apparatus according to claim 5, wherein said memory comprises:

an inverse orthogonal transform processor operable to apply an inverse orthogonal transform to the compensation signal which is in a form of a coefficient difference;

a coefficient difference memory operable to store the coefficient difference; and an orthogonal transform processor operable to apply an orthogonal transform to the coefficient difference.

7. An image recompression apparatus according to claim 5, further comprising:

an inverse orthogonal transform processor, provided in association with said first inverse quantizer, operable to generate the first inverse quantized coefficient in an inverse orthogonal transformed format;

an orthogonal transform processor, provided in association with said first subtractor, operable to generate the difference data in an orthogonal transformed format;

a reinverse orthogonal transform processor, provided in association with said second inverse quantizer, operable to generate the second inverse quantized coefficient in an inverse orthogonal transformed format.

8. An image recompression apparatus according to claim 5, further comprising a switch operable to selectively produce either one of the coded image input data and the compressed coded image input data, and a storage device operable to store the selected data.

9. An image recompression apparatus comprising:

a variable length decoder operable to decode from a coded image input data, a first conversion coefficient block, and other information data;

a first subtractor operable to subtract a compensation coefficient, based on a previous image data, from the first conversion coefficient block to generate a second conversion coefficient block;

a selector operable to select a predetermined number of coefficients from the second conversion coefficient block to form a third conversion coefficient block;

an adder operable to add the compensation coefficient to the third conversion coefficient block to generate a sum data;

a second subtractor operable to subtract the first conversion coefficient block from the sum data to generate a compensation coefficient of the next image data;

a memory operable to store the compensation coefficient;

a variable length coder operable to convert the third conversion coefficient block to variable length code; and a multiplexer operable to multiplex the variable length code and the other information data to generate a compressed coded image input data.

10. An image recompression apparatus according to claim 9, wherein said memory comprises:

an inverse orthogonal transform processor operable to apply an inverse orthogonal transform to the compensation coefficient which is in a form of a coefficient difference;

a coefficient difference memory operable to store the coefficient difference; and an orthogonal transform processor operable to apply an orthogonal transform to the coefficient difference.

11. An image recompression apparatus according to claim 9, further comprising a switch operable to selectively produce either one of the coded image input data and the compressed coded image input data, and a storage device operable to store the selected data.

* * * * *